(12) United States Patent
Hata et al.

(10) Patent No.: US 8,158,006 B2
(45) Date of Patent: Apr. 17, 2012

(54) METHOD FOR REMOVING FLUORINE USING A FLUORINE ADSORBENT/DESORBENT

(75) Inventors: Hiroshi Hata, Ageo (JP); Kenji Haiki, Ageo (JP); Kazuhiko Nishina, Shimonoseki (JP); Masatami Sakata, Tokyo (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 12/985,184

(22) Filed: Jan. 5, 2011

(65) Prior Publication Data

US 2011/0094339 A1    Apr. 28, 2011

Related U.S. Application Data

(62) Division of application No. 11/658,163, filed as application No. PCT/JP2005/013121 on Jul. 15, 2005.

(30) Foreign Application Priority Data

Jul. 23, 2004   (JP) ................................ 2004-216410
May 26, 2005   (JP) ................................ 2005-154608

(51) Int. Cl.
   *C02F 1/28* (2006.01)
(52) U.S. Cl. .......... 210/670; 210/683; 210/915; 423/503
(58) Field of Classification Search .............. 210/502.1, 210/670, 683, 915; 423/503; 502/406
   See application file for complete search history.

(56) References Cited

U.S. PATENT DOCUMENTS

| | | | | |
|---|---|---|---|---|
| 2,059,553 A | * | 11/1936 | Churchill | 210/670 |
| 2,139,227 A | * | 12/1938 | Goetz | 210/670 |
| 2,207,725 A | * | 7/1940 | Elvove | 210/683 |
| 4,159,246 A | * | 6/1979 | Matsumoto | 205/756 |
| 4,717,554 A | * | 1/1988 | Nomura et al. | 210/670 |
| 5,531,903 A | | 7/1996 | Hampton et al. | |
| 6,254,312 B1 | * | 7/2001 | Chowdhury et al. | 588/320 |
| 7,314,569 B2 | | 1/2008 | Cadena C. et al. | |
| 2008/0035562 A1 | | 2/2008 | Hata et al. | |

FOREIGN PATENT DOCUMENTS

| | | | |
|---|---|---|---|
| JP | 62121690 A | * | 6/1987 |
| JP | 4-221089 | | 8/1992 |
| JP | 8-024634 | | 1/1996 |
| JP | 2001-121140 | | 5/2001 |

(Continued)

OTHER PUBLICATIONS

Jinadasa et al., "Adsorption of Fluoride on goethite surfaces-implications on dental epidemiology," Environmental Geology, vol. 21, pp. 251-255, 1993.

(Continued)

*Primary Examiner* — Matthew Savage
(74) *Attorney, Agent, or Firm* — Greenblum & Bernstein, PLC

(57) ABSTRACT

In order to remove fluorine from a zinc containing solution before zinc electro-refining in lower cost, fluorine is removed by adsorption from a zinc containing solution (leached solution) utilizing the character of the predetermined iron compound or zinc compound which can adsorb fluorine in an acid solution and desorb fluorine in an alkaline solution. The fluorine adsorbent/desorbent having adsorbed fluorine is treated in an alkaline solution, to desorb the fluorine. This makes it possible to regenerate the fluorine adsorbent/desorbent. Further, an electrolytic solution for zinc electro-refining can be prepared in lower cost, thus total zinc refining costs can be reduced.

3 Claims, 3 Drawing Sheets

No.7

FOREIGN PATENT DOCUMENTS

| | | |
|---|---|---|
| JP | 2002-105685 | 4/2002 |
| JP | 2003112162 A * | 4/2003 |
| JP | 2003-334542 | 11/2003 |
| JP | 2004-41889 | 2/2004 |
| JP | 2004-66161 | 3/2004 |
| JP | 2004-351392 | 12/2004 |
| JP | 2005-74259 | 3/2005 |

OTHER PUBLICATIONS

International Search Report for PCT/JP2005/013121, mailed Aug. 23, 2005.

* cited by examiner

No.7

No.1

METHOD FOR REMOVING FLUORINE USING A FLUORINE ADSORBENT/DESORBENT

CROSS-REFERENCE TO RELATED APPLICATIONS

This application is a divisional of U.S. patent application Ser. No. 11/658,163, still pending, which is a National Stage of International Application No. PCT/JP2005/013121, filed Jul. 15, 2005. This application also claims priority to Japanese Application Nos. JP 2004-216410, filed Jul. 23, 2004, and JP 2005-154608, filed May 26, 2005. The entire disclosures of application Ser. No. 11/658,163 and International Application No. PCT/JP2005/13121, are considered as being part of this application, and the entire disclosures of each of these applications are expressly incorporated by reference herein in their entireties.

BACKGROUND OF THE INVENTION

1. Field of the Invention

The present invention relates to a fluorine adsorbent/desorbent applicable repeatedly for adsorbing and desorbing of fluorine contained in a zinc electrolytic solution for electro-refining, the fluorine being contained by dissolving a zinc containing material containing the fluorine, as well as a method for removing the fluorine using this fluorine adsorbent/desorbent. (The term "fluorine adsorbent/desorbent" used in the specification refers to chemicals that can adsorb and desorb (in other words, attach and detach) fluorine in a given solution as described above.)

2. Description of the Related Art

In conventional zinc electro-refining, electrolytically refined zinc of purity 99.99% is manufactured through, desulfurization of zinc sulfide concentrate as raw material by roasting, dissolving and leaching out of the roasted zinc concentrate into acid solution such as a sulfuric acid solution to prepare a zinc electrolytic solution, and then carrying out electrolysis.

On the other hand, the following method is used in a steel mill (or steel recycle plant) in recent years: a zinc containing material (simply referred to as a "zinc containing material" containing at least zinc and fluorine) is first recovered from steel dust emitted during a steel production process, or zinc residues resulting from a zinc plating process. Then, the zinc containing material is mixed with roasted concentrate. The mixture is then dissolved into an acid solution to obtain a zinc electrolytic solution. The solution is then served for electrolysis to obtain zinc. This method may reduce the costs of the materials.

This zinc containing material is not a sulfide, so it needs no roasting. This allows a reduction in manufacturing costs for an intermediate process. However, the zinc containing material may cause problems because it has halogen elements. The halogen element is not limited to fluorine. However, the present application focuses on fluorine, which causes problems in zinc electro-refining as described below in detail.

That is, if the contained fluorine is come into an electrolytic solution, during zinc electro-deposition, an aluminum cathode may be corroded by fluorine to prevent electrodeposited zinc from being stripped. This precludes the aluminum plate to be repeatedly used, thus significantly hindering mass productivity.

Thus, several methods have been proposed.

First, Patent Document 1 discloses three methods for removing the contained fluorine from the electrolytic solution: a method of washing a zinc source (raw material of zinc) (this method will be referred to as a conventional method 1 below), a method of removing fluorine by sulfating roasting or the like (this method will be referred to as a conventional method 2 below), and a method of electro-deposition of zinc in two steps; in the first step, a sulfuric acid zinc solution free from fluorine ions is used to deposit predetermined zinc, and in the second step, a sulfuric acid zinc sulfate solution containing fluorine ions is used to obtain zinc (this method will be referred to as a conventional method 3 below).

Further, Patent Document 2 discloses a method for removing fluorine directly from a zinc electrolytic solution using cerium hydroxide (this method will be referred to as a conventional method 4).

Moreover, Patent Document 3 discloses an apparatus that removes fluorine and the like for waste water treatment. Further, Patent Document 4 discloses an anion adsorbent consist of amorphous iron hydroxide group precipitate for anions such as fluorine ion for waste water treatment.

[Patent Document 1] Japanese Patent Laid-Open No. 1992-221089
[Patent Document 2] Japanese Patent Laid-Open No. 2002-105685
[Patent Document 3] Japanese Patent Laid-Open No. 2004-351392
[Patent Document 4] Japanese Patent Laid-Open No. 2003-334542

However, the conventional method 1 may not sufficiently remove fluorine.

Further, the conventional method 2 may increase costs and is thus economically disadvantageous.

Furthermore, the conventional method 3 requires the process to be divided into two steps. Accordingly, it can eliminate the effects of fluorine but it has the drawbacks in increasing of the costs for investment of refining plants and equipment with complicated process management.

Moreover, the conventional method 4 is economically disadvantageous because the price of cerium hydroxide used for adsorbing fluorine is expensive. The conventional method 4 is expected to be difficult to actually apply on a plant scale.

Thus, the conventional methods 1 to 4 disclosed in Patent Documents 1 and 2 may increase total cost even though they successfully reduce material costs. As a result, these methods may loose their industrial advantage of enabling resource recycling while reducing costs by using a zinc containing material obtained by recovering steel dust and the like, which have been conventionally wasted.

Patent Document 3 discloses a technique for removing fluorine and the like which is applied only to an industrial waste water treatment (waste solution treatment). Specifically, Patent Document 3 discloses a method of adding calcium to fluorine as a water-soluble metal compound to deposit calcium fluoride and then removing fluorine and the like. That is, this is different from the method for removing fluorine according to the present invention in the order of treatment and the configuration of treatment steps.

Further, Patent Document 4 discloses a technique only applied to industrial waste water treatment (waste solution treatment) and relating mainly to a method for removing heavy metals. In particular, as is apparent from the embodiments in Patent Document 4, the method disclosed in Patent Document 4 relate to removal of heavy metal such as arsenic, antimony, selenium, chromium, molybdenum or cadmium from waste water mainly.

However, in general, when the concentration of fluorine in a zinc electrolytic solution exceeds 20 mg/L, an aluminum cathode is remarkably corroded in zinc electro-refining. Consequently, tendency that the deposited zinc cannot be stripped off occurs. This results the difficulty in performing an electro-refining operation and an extreme reduction in the lifetime of the aluminum plate for repeating use. The manufacturing costs may thus increase. Therefore, it has been desirable to maintain the concentration of fluorine in the zinc electrolytic solution below 20 mg/L.

As apparent from the above description, a technique for removing fluorine from a zinc electrolytic solution (technique for absorption and desorption of fluorine) has been desired. The technique allows using a zinc containing material containing fluorine without preventing a cost reduction achieved by the use of an inexpensive material, that is, zinc residues, from causing total costs to increase during the subsequent steps. Also the technique is capable of reducing facility costs and ease process management. The present inventors have completed the present invention according to this technique.

SUMMARY OF THE INVENTION

The present inventors eagerly made efforts to solve the above problems and have thus found measures described below. When mixture of a zinc containing material and roasted zinc concentrate is used as a zinc raw material, the concentration of fluorine in a zinc solution increases to possibly corrode an aluminum cathode. In order to solve this problem, first step is to effectively adsorb fluorine present in an electrolytic solution to a fluorine adsorbent/desorbent before an electrolysis. Second step is to desorb the adsorbed fluorine to reuse the fluorine adsorbent/desorbent. The means for solving the above problems will be described below.

The present invention provides a fluorine adsorbent/desorbent used to adsorb fluorine from a zinc electrolytic solution containing fluorine and desorb the fluorine, which is a basic iron sulfate group fluorine adsorbent/desorbent being characterized in that when the fluorine adsorbent/desorbent as a whole is assumed to be 100 wt %, the fluorine adsorbent/desorbent contains 70 wt % or more and 100 wt % or less of one or both of $(Fe(SO_4)_x(OH)_y$ (wherein x and y are any real numbers, which are same in the present description and claims) and $(FeO_a(OH)_b(SO_4)_c(H_2O)_d$ (wherein a, b, c and d are any real numbers, which are same in the present description and claims) that are basic iron sulfate group iron compounds and 0 wt % or more and 30 wt % or less of any of aluminum, titanium, zirconium and magnesium or a compound of any of aluminum, titanium, zirconium and magnesium. The basic iron sulfate group fluorine adsorbent/desorbent may contain elements other than those listed above. That is, for the fluorine adsorbent/desorbent according to the present invention, the case is not excluded where the total wt % of the basic iron sulfate group iron compound and the chemicals listed above is less than 100 wt %.

Moreover, the present invention provides a fluorine adsorbent/desorbent used to adsorb fluorine from a zinc electrolytic solution containing fluorine and desorb the fluorine, which is the basic iron sulfate group fluorine adsorbent/desorbent characterized in that the basic iron sulfate group iron compound adsorbs the fluorine in an acid solution of pH 3.0 or more and less than 7.0 and desorbs fluorine in an alkaline solution of pH being more than 7.0 and being equal to 13.5 or less.

The present invention provides a fluorine adsorbent/desorbent used to adsorb fluorine from a zinc electrolytic solution containing fluorine and desorb the fluorine, which is an oxy iron hydroxide group fluorine adsorbent/desorbent being characterized in that when the fluorine adsorbent/desorbent as a whole is assumed to be 100 wt %, the fluorine adsorbent/desorbent contains 70 wt % or more and 100 wt % or less of oxy iron hydroxide and 0 wt % or more and 30 wt % or less of aluminum, titanium, zirconium, magnesium and copper, or a compound of any of aluminum, titanium, zirconium, magnesium and copper. The oxy iron hydroxide group fluorine adsorbent/desorbent may contain elements other than those listed above. That is, for the fluorine adsorbent/desorbent according to the present invention, the case is not excluded where the total wt % of oxy iron hydroxide and the chemicals listed above is less than 100 wt %.

The present invention provides a fluorine adsorbent/desorbent used to adsorb fluorine from a zinc electrolytic solution containing fluorine and desorb the fluorine, which is the oxy iron hydroxide group fluorine adsorbent/desorbent being characterized in that the oxy iron hydroxide is Goethite ($\alpha$-FeOOH) or Akaganeite ($\beta$-FeOOH).

The present invention provides the oxy iron hydroxide group fluorine adsorbent/desorbent characterized in that the oxy iron hydroxide group fluorine adsorbent/desorbent adsorbs the fluorine in an acid solution of pH 1.0 or more and less than 7.0 and desorbs the fluorine in an alkaline solution of pH being more than 7.0 and being equal to or less than 13.5.

The present invention provides a fluorine adsorbent/desorbent used to adsorb fluorine from a zinc electrolytic solution containing fluorine and desorb the fluorine, which is an iron oxide group fluorine adsorbent/desorbent being characterized in that when the fluorine adsorbent/desorbent as a whole is assumed to be 100 wt %, the fluorine adsorbent/desorbent contains 70 wt % or more and 100 wt % or less of iron oxide and 0 wt % or more and 30 wt % less of any of aluminum, titanium, zirconium and magnesium or a compound of any of aluminum, titanium, zirconium and magnesium. The iron oxide group fluorine adsorbent/desorbent may contain elements other than those listed above. That is, for the fluorine adsorbent/desorbent according to the present invention, the case is not excluded where the total wt % of iron oxide and the chemicals listed above is less than 100 wt %.

The present invention provides the iron oxide group fluorine adsorbent/desorbent characterized in that the iron oxide is Hematite ($\alpha$-Fe$_2$O$_3$).

The present invention provides the iron oxide group fluorine adsorbent/desorbent characterized in that the iron oxide group fluorine adsorbent/desorbent adsorbs the fluorine in an acid solution of pH 1.0 or more and less than 7.0 and desorbs the fluorine in an alkaline solution of pH being more than 7.0 and being equal to 13.5 or less.

The present invention provides a fluorine adsorbent/desorbent used to adsorb fluorine from a zinc electrolytic solution containing fluorine and desorb the fluorine, which is a ferric hydroxide group fluorine adsorbent/desorbent being characterized in that when the fluorine adsorbent/desorbent as a whole is assumed to be 100 wt %, the fluorine adsorbent/desorbent contains 70 wt % or more and 100 wt % or less of ferric hydroxide and 0 wt % or more and 30 wt % or less of any of aluminum, titanium, zirconium and magnesium or a compound of any of aluminum, titanium, zirconium and magnesium. The ferric hydroxide group fluorine adsorbent/desorbent may contain elements other than those listed above. That is, for the fluorine adsorbent/desorbent according to the present invention, the case is not excluded where the total wt % of ferric hydroxide and the chemicals listed above is less than 100 wt %.

The present invention provides a fluorine adsorbent/desorbent used to adsorb fluorine from a zinc electrolytic solution containing fluorine and desorb the fluorine, which is the ferric hydroxide group fluorine adsorbent/desorbent being characterized in that the iron oxide group fluorine adsorbent/desorbent adsorbs the fluorine in an acid solution of pH 3.0 or more and less than 7.0 and desorbs the fluorine in an alkaline solution of pH being more than 7.0 and being equal to 13.5 or less.

The present invention provides a fluorine adsorbent/desorbent used to adsorb fluorine from a zinc electrolytic solution containing fluorine and desorb the fluorine, which is a basic zinc sulfate group fluorine adsorbent/desorbent being characterized in that when the fluorine adsorbent/desorbent as a whole is assumed to be 100 wt %, the fluorine adsorbent/desorbent contains 70 wt % or more and 100 wt % or less of basic zinc sulfate $(Zn(SO_4)_x(OH)_y$ (wherein x and y are real numbers)) and 0 wt % or more and 30 wt % or less of any of aluminum, titanium, zirconium and magnesium or a compound of any of aluminum, titanium, zirconium and magnesium. The fluorine adsorbent/desorbent according to the present invention may contain elements other than those listed above. That is, for the fluorine adsorbent/desorbent according to the present invention, the case is not excluded where the total wt % of the basic zinc sulfate and the chemicals listed above is less than 100 wt %.

The present invention provides the basic zinc sulfate group fluorine adsorbent/desorbent characterized in that the basic zinc sulfate group fluorine adsorbent/desorbent adsorbs the fluorine in an acid solution of pH 4.0 or more and less than 7.0 and desorbs the fluorine in an alkaline solution of pH being more than 7.0 and being equal to 13.5 or less.

The present invention provides a method comprising a step of removing fluorine from a zinc electrolytic solution containing fluorine, the method comprising:

a fluorine adsorption step a of adsorbing fluorine to a basic iron sulfate group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorbs the fluorine from the fluorine adsorbent/desorbent;

a second solid/liquid separating step d of separating the solution obtained in the step c into a solid and a liquid; and a fluorine adsorbent/desorbent reuse step e of sending back the solid resulting from the solid-liquid separation in the step d or a solution after dissolving the solid in an acid solution, to the step a as the fluorine adsorbent/desorbent for the step a. The method may include a step of transferring the liquid resulting from the solid-liquid separation in the step b as a zinc electrolytic solution.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the liquid into which the solution was separated in the step g, to the step c in the form of an alkaline solution put into the step c.

The present invention provides the method for removing fluorine using the basic iron hydroxide group fluorine adsorbent/desorbent, the method being characterized in that when the fluorine adsorbent/desorbent as a whole is assumed to be 100 wt %, the fluorine adsorbent/desorbent contains 70 wt % or more and 100 wt % or less of one or both of $(Fe(SO_4)_x(OH)_y$ (wherein x and y are any real numbers)) and $(FeO_a(OH)_b(SO_4)_c(H_2O)_d$ (wherein a, b, c, and d are any real numbers)) that are basic iron sulfate group iron compounds and 0 wt % or more and 30 wt % or less of any of aluminum, titanium, zirconium and magnesium or a compound of any of aluminum, titanium, zirconium and magnesium. That is, for the fluorine adsorbent/desorbent according to the present invention, the case is not excluded where the total wt % of the basic zinc sulfate and the chemicals listed above is less than 100 wt %.

Moreover, the present invention provides the method for removing fluorine using a basic iron sulfate group fluorine adsorbent/desorbent, the method being characterized in that the fluorine adsorbent-desorbent adsorbs the fluorine in an acid solution of pH 3.0 or more and less than 7.0 and desorbs the fluorine in an alkaline solution of pH being more than 7.0 and being equal to 13.5 or less.

In this case, a sulfate group and zinc adsorbed by the basic iron sulfate group fluorine adsorbent/desorbent together with fluorine during the step a of the method for removing fluorine may be introduced into a liquid in an acid solution of pH 3.0 or more and less than 7.0 and thus removed before the fluorine is desorbed from the fluorine adsorbent/desorbent in an alkaline solution of pH being more than 7.0 and being equal to 13.5 or less.

The present invention provides a method comprising a step of removing fluorine from a zinc electrolytic solution containing fluorine, the method comprising:

a fluorine adsorption step a of adsorbing fluorine to an oxy iron hydroxide group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorb the fluorine from the fluorine adsorbent/desorbent;

a second solid/liquid separating step d of separating the solution obtained in the step c into a solid and a liquid; and a fluorine adsorbent/desorbent reuse step e of sending back the solid resulted from the solid-liquid separation in the step d, to the step a as the fluorine adsorbent/desorbent for the step a. The method may include a step of transferring, as a zinc electrolytic solution, the liquid resulting from the solid-liquid separation in the step b.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the liquid which is separated in the step g to the step c as an alkaline solution put in the step c.

The present invention provides a method for removing oxy iron hydroxide group fluorine, the method being characterized in that when the fluorine adsorbent/desorbent as a whole is assumed to be 100 wt %, the fluorine adsorbent/desorbent contains 70 wt % or more and 100 wt % or less of Goethite ($\alpha$-FeOOH) or Akaganeite ($\beta$-FeOOH) that is the oxy iron hydroxide group fluorine adsorbent/desorbent and 0 wt % or more and 30 wt % or less of aluminum, titanium, zirconium, magnesium and copper, or a compound of any of aluminum, titanium, zirconium, magnesium and copper. That is, for the fluorine adsorbent/desorbent according to the present invention, the case is not excluded where the total wt % of the basic zinc sulfate and the chemicals listed above is less than 100 wt %.

Moreover, the present invention provides the method for removing fluorine using an oxy iron hydroxide group fluorine adsorbent/desorbent, the method being characterized in that the fluorine adsorbent/desorbent adsorbs the fluorine in an acid solution of pH 1.0 or more and less than 7.0 and desorbs the fluorine in an alkaline solution of pH being more than 7.0 and being equal to 13.5 or less.

The present invention provides a method comprising a step of removing fluorine from a zinc electrolytic solution containing fluorine, the method comprising:

a fluorine adsorption step a of adsorbing fluorine to an iron oxide group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorb the fluorine from the fluorine adsorbent/desorbent;

a second solid/liquid separating step d of separating the solution obtained in the step c into a solid and a liquid; and a fluorine adsorbent/desorbent reuse step e of sending back the solid resulted from the solid-liquid separation in the step d, to the step a as the fluorine adsorbent/desorbent for the step a. The method may include a step of transferring the liquid resulting from the solid-liquid separation in the step b as a zinc electrolytic solution.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the liquid into which the solution was separated in the step g, to the step c in the form of an alkaline solution introduced in the step c.

The present invention provides the method for removing iron oxide group fluorine, the method being characterized in that when the fluorine adsorbent/desorbent as a whole is assumed to be 100 wt %, the fluorine adsorbent/desorbent contains 70 wt % or more and 100 wt % or less of Hematite ($\alpha$-$Fe_2O_3$) that is the iron oxide group fluorine adsorbent/desorbent and 0 wt % or more and 30 wt % or less of any of aluminum, titanium, zirconium and magnesium or a compound of any of aluminum, titanium, zirconium and magnesium. That is, for the fluorine adsorbent/desorbent according to the present invention, the case is not excluded where the total wt % of the basic zinc sulfate and the chemicals listed above is less than 100 wt %.

Moreover, the present invention provides the method for removing fluorine using an iron oxide group fluorine adsorbent/desorbent, the method being characterized in that the fluorine adsorbent/desorbent adsorbs the fluorine in an acid solution of pH 1.0 or more and less than 7.0 and desorbs the fluorine in an alkaline solution of pH being more than 7.0 and being equal to 13.5 or less.

The present invention provides a method comprising a step of removing fluorine from a zinc electrolytic solution containing fluorine, the method comprising:

a fluorine adsorption step a of adsorbing fluorine to a ferric hydroxide group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorb the fluorine from the fluorine adsorbent/desorbent;

a second solid/liquid separating step d of separating the solution obtained in the step c into a solid and a liquid; and a fluorine adsorbent/desorbent reuse step e of sending back the solid separated in the step d or a solution after dissolving the solid in an acid solution for the step a as the fluorine adsorbent/desorbent in the step a. The method may include a step of transferring the liquid separated in the step b as a zinc electrolytic solution.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the solution separated in the step g, to the step c in the form of an alkaline solution put in the step c.

The present invention provides the method for removing fluorine using the iron oxide group fluorine adsorbent/desorbent, the method being characterized in that when the fluorine adsorbent/desorbent as a whole is assumed to be 100 wt %, the fluorine adsorbent/desorbent contains 70 wt % or more and 100 wt % or less of ferric hydroxide ($Fe(OH)_3$) that is the ferric hydroxide group fluorine adsorbent/desorbent and 0 wt % or more and 30 wt % or less of any of aluminum, titanium, zirconium and magnesium or a compound of any of aluminum, titanium, zirconium and magnesium. That is, for the fluorine adsorbent/desorbent according to the present invention, the case is not excluded where the total wt % of the basic zinc sulfate and the chemicals listed above is less than 100 wt %.

Moreover, the present invention provides the method for removing fluorine using a ferric hydroxide group fluorine adsorbent/desorbent, the method being characterized in that the fluorine adsorbent/desorbent adsorbs the fluorine in an acid solution of pH 3.0 or more and less than 7.0 and desorbs the fluorine in an alkaline solution of pH being more than 7.0 and being equal to 13.5 or less.

The present invention provides a method comprising a step of removing fluorine from a zinc electrolytic solution containing fluorine, the method comprising:

a fluorine adsorption step a of adsorbing fluorine to a basic zinc sulfate group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorb the fluorine from the fluorine adsorbent/desorbent;

a second solid/liquid separating step d of separating the solution obtained in the step c into a solid and a liquid; and a fluorine adsorbent/desorbent reuse step e of sending back the solid resulting from the solid-liquid separation in the step d or a solution after dissolving the solid in an acid solution, to the step a as the fluorine adsorbent/desorbent for the step a. The method may include a step of transferring the liquid separated in the step b as a zinc electrolytic solution.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the solution separated in the step g, to the step c in the form of an alkaline solution put in the step c.

The present invention provides the method for removing fluorine using the basic zinc sulfate group fluorine adsorbent/desorbent, the method being characterized in that when the fluorine adsorbent/desorbent as a whole is assumed to be 100 wt %, the fluorine adsorbent/desorbent contains at 70 wt % or more and 100 wt % or less of basic zinc sulfate $(Zn(SO_4)_x(OH)_y$ (wherein x and y are real numbers) and 0 wt % or more and 30 wt % or less of any of aluminum, titanium, zirconium and magnesium or a compound of any of aluminum, titanium, zirconium and magnesium. That is, for the fluorine adsorbent/desorbent according to the present invention, the case is not excluded where the total wt % of the basic zinc sulfate and the chemicals listed above is less than 100 wt %.

Moreover, the present invention provides the method for removing fluorine using a basic zinc sulfate group fluorine adsorbent/desorbent, the method being characterized in that the basic zinc sulfate group fluorine adsorbent/desorbent adsorbs the fluorine in an acid solution of pH 4.0 or more and less than 7.0 and desorbs the fluorine in an alkaline solution of pH being more than 7.0 and being equal to 13.5 or less.

According to the present invention, the fluorine adsorbent/desorbent is allowed to adsorb fluorine on and desorb the fluorine from a zinc electrolytic solution before zinc electro-deposition in a zinc electrolytic bath. This enables the content of fluorine in the solution to be set to a predetermined value or less. The fluorine adsorbent/desorbent can be repeatedly used.

DETAILED DESCRIPTION OF THE PREFERRED EMBODIMENTS

Figure 1:
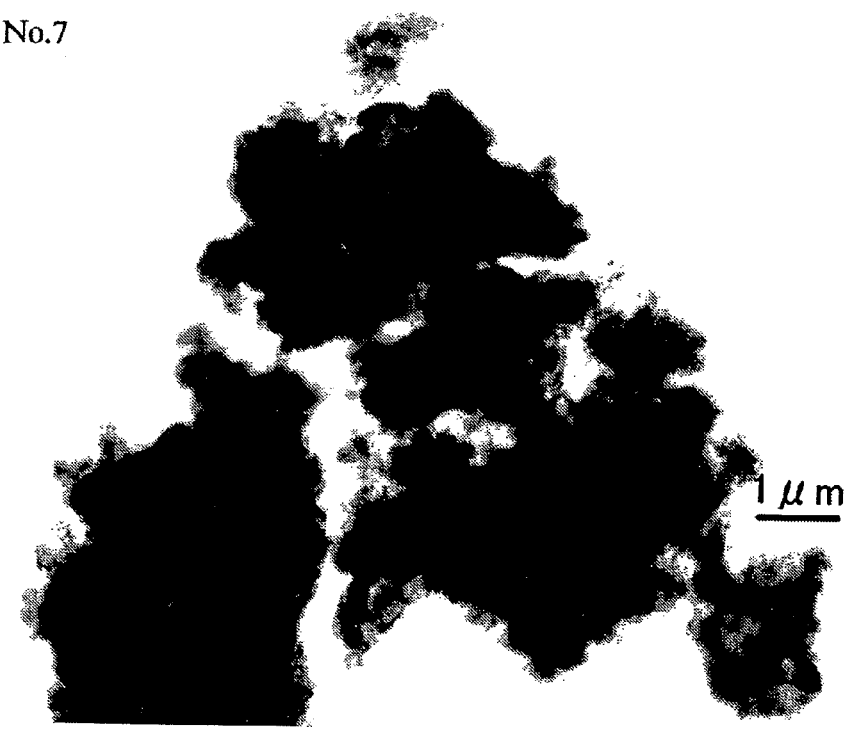
FIG. 1 is an example of a photograph of a TEM observation on a basic iron sulfate group iron compound according to the present invention (about 10,000× magnification)

As the best mode for carrying out the present invention, a <fluorine adsorbent/desorbent>, a <method for manufacturing a fluorine adsorbent/desorbent> and a <method for removing fluorine using a fluorine adsorbent/desorbent> used to remove fluorine from a zinc electrolytic solution will be described one by one below.
<Fluorine Adsorbent/Desorbent>

One embodiment of a fluorine adsorbent/desorbent according to the present invention is characterized in that, in zinc electro-refining for zinc production utilizing a zinc containing material, fluorine contained in a zinc electrolytic solution is adsorbed in an acid solution and the fluorine is desorbed in an alkaline solution by using the fluorine adsorbent/desorbent.

In the present embodiment, the main components of the fluorine adsorbent/desorbent are 1) a basic iron sulfate group iron compound, 2) oxy iron hydroxide, 3) iron oxide, 4) ferric hydroxide, and 5) basic zinc sulfate. Thus, in the present application, the fluorine adsorbent/desorbents from 1) to 5) are called as "basic iron sulfate group fluorine adsorbent/desorbent", "oxy iron hydroxide group fluorine adsorbent/desorbent", "iron oxide group fluorine adsorbent/desorbent", "ferric hydroxide group fluorine adsorbent/desorbent" and "basic zinc sulfate group fluorine adsorbent/desorbent" respectively for convenience.

1) Basic Iron Sulfate Group Fluorine Adsorbent/desorbent:

Preferably, the basic iron sulfate group iron compound is basically expressed in formula $Fe(SO_4)_x(OH)_y$ (x is a real number that is preferably 0.1 or more and 2 or less and y is an arbitrary real number that is 0.2 or more and 2.5 or less). Alternatively, it may be expressed by $FeO_a(OH)_b(SO_4)_c(H_2O)_d$ (a, b, c and d are any real numbers). For example, the basic iron sulfate group iron compound is Glockerite $(Fe_4SO_4(OH)_{10})$, Schwertmannite $(Fe_8O_8SO_4(OH)_6)$, or the like. Moreover, the basic iron sulfate group iron compound includes $Fe(SO_4)_x(OH)_y$ such as Jarosite $(AFe_3(SO_4)_2(OH)_6$ ("A" may be Na, K, NH4, Pb, Ag, $H_3O$, or the like) containing any of the various chemicals listed above.

Moreover, the basic iron sulfate group iron compound alone can be used as a fluorine adsorbent/desorbent. However, the basic iron sulfate group iron compound may be provided with 0 wt % or more and 30 wt % or less of any of aluminum, titanium, zirconium or magnesium which has affinity for fluorine or a compound of any of aluminum, titanium, zirconium and magnesium (in this case, the wt % of the basic iron sulfate group iron compound is 70 wt % or more and 100 wt % or less).

As described above, all these chemicals have a strong affinity for fluorine. Since the addition of aluminum or the like serves to provide an excellent fluorine adsorption and desorption capability, 1 wt % or more of any of the chemicals is preferably added (See the examples described below. This also applies to the following description).

Here, 0 wt % or more and 30 wt % or less of aluminum or the like is added because the addition of more than 30 wt % increases costs owing to the expensive prices of these additives compared to those of iron and zinc group adsorbent/desorbents. When wt % of the basic iron sulfate group iron compound is 100 wt %, no additives are used, that is, the fluorine adsorbent/desorbent is composed only of the basic iron sulfate group iron compound.

The basic iron sulfate group fluorine adsorbent/desorbent can adsorb the fluorine in an acid solution of pH 3.0 or more and less than 7.0 and desorbs the fluorine in an alkaline solution of pH being more than 7.0 and being equal to 13.5 or less. The basic iron sulfate group fluorine adsorbent/desorbent thus functions as a fluorine adsorbent/desorbent.

The reason why the basic iron sulfate group fluorine adsorbent/desorbent adsorbs fluorine in an acid solution of pH 3.0 or more and less than 7.0 is, at a pH of less than 3.0, the fluorine adsorption capability falls and the fluorine adsorbent/desorbent start to partly dissolve. On the other hand, at a pH of 7.0 or more, the fluorine adsorption capability falls.

On the other hand, the reason why the basic iron sulfate group fluorine adsorbent/desorbent desorbs fluorine in an acid solution of pH being more than 7.0 and being equal to 13.5 or less is, a pH of less than 7.0 corresponds to an acid solution that is an inappropriate condition for desorbing fluorine from the fluorine adsorbent/desorbent. On the other hand, at a pH of more than 13.5, a very large amount of alkali may be required for pH adjustment. Further, the fluorine adsorbent/desorbent is modified and deteriorated to fall a re-adsorption capability. This prevents the repeating use of the fluorine adsorbent/desorbent.

With the basic iron sulfate group fluorine adsorbent/desorbent, a sulfate group and zinc may also be adsorbed by the basic iron sulfate group fluorine adsorbent/desorbent together with fluorine in a solution with a pH region of pH 3.0 or more and less than 7.0. The sulfate group and zinc must be removed before fluorine desorption. Subsequently, the fluorine is desorbed from the fluorine adsorbent/desorbent in a pH region of pH being more than 7.0.

This is a characteristic of the basic iron sulfate group iron compound. Thus, the sulfate group and zinc adsorbed to the basic iron sulfate group fluorine adsorbent/desorbent should be removed from the fluorine adsorbent/desorbent by using the above treatment before desorbing fluorine in a liquid with a pH region of pH 3.0 or more and less than 7.0. It makes it possible to reduce the amount of calcium sulfate (gypsum) resulting by the sulfate during fluorine recovery.

2) Oxy Iron Hydroxide Group Fluorine Adsorbent/Desorbent:

The oxy iron hydroxide is preferably Goethite ($\alpha$-FeOOH) or Akaganeite ($\beta$-FeOOH). Lepidorocrocite ($\gamma$-FeOOH), Ferryhydrite ($Fe_5O_7(OH).4H_2O$), or the like can also be used.

The oxy iron hydroxide alone can be used as a fluorine adsorbent/desorbent. However, the oxy iron hydride may be provided with 0 wt % or more and 30 wt % or less of any of aluminum, titanium, zirconium, magnesium or copper, or a compound of any of aluminum, titanium, zirconium, magnesium and copper (in this case, the wt % of the oxy iron hydroxide is 70 wt % or more and 100 wt % or less). Since the addition of aluminum or the like serves to provide an excellent fluorine adsorption and desorption capability, 1 wt % or more of any of the chemicals is preferably added (see the examples described below). Here, 0 wt % or more and 30 wt % or less of aluminum or the like is added because the addition of more than 30 wt % increases costs owing to the expensive prices of these additives compared to those of iron and zinc group adsorbent/desorbents. When wt % of the oxy iron hydroxide is 100 wt %, no additives are used, that is, the fluorine adsorbent/desorbent is composed only of oxy iron hydroxide.

If the oxy iron oxide group fluorine adsorbent/desorbent is the Akaganeite or Goethite, it can adsorb the fluorine in an acid solution of pH 1.0 or more and less than 7.0 and desorb the fluorine in an alkaline solution of pH being more than 7.0 and being equal to 13.5 or less. The oxy iron hydroxide group fluorine adsorbent/desorbent thus functions as a fluorine adsorbent/desorbent.

The oxy iron hydroxide group fluorine adsorbent/desorbent adsorbs fluorine in an acid solution of pH 1.0 or more and less than 7.0 because, at a pH of less than 1.0, the fluorine adsorbent/desorbent is partly dissolved. On the other hand, at a pH of 7.0 or more, the fluorine adsorption capability falls.

On the other hand, the fluorine adsorbent/desorbent desorbs fluorine in an alkaline solution of pH being more than 7.0 and being equal to 13.5 or less because a pH of less than 7.0 corresponds to an acid solution that is an inappropriate condition for desorbing fluorine from the fluorine adsorbent/desorbent. On the other hand, at a pH of more than 13.5, a very large amount of alkali may be required for pH adjustment. Further, the fluorine adsorbent/desorbent is modified and deteriorated to fall a re-adsorption capability. This prevents the repeated use of the fluorine adsorbent/desorbent.

3) Iron Oxide Group Fluorine Adsorbent/Desorbent:

Iron oxide is preferably Hematite ($\alpha$-$Fe_2O_3$).

The iron oxide alone can be used as a fluorine adsorbent/desorbent. However, as described above, the iron oxide may be provided with 0 wt % or more and 30 wt % or less of any of aluminum, titanium, zirconium or magnesium or a compound of any of aluminum, titanium, zirconium and magnesium (in this case, the wt % of the iron oxide is 70 wt % or more and 100 wt % or less). Since the addition of aluminum or the like serves to provide an excellent fluorine adsorption and desorption capability, 1 wt % or more of any of the chemicals is preferably added. Here, 0 wt % or more and 30 wt % or less of aluminum or the like is added because the addition of more than 30 wt % increases costs owing to the expensive prices of these additives compared to those of iron and zinc group fluorine adsorbent/desorbents. When wt % of the iron oxide is 100 wt %, no additives are used, that is, the fluorine adsorbent/desorbent is composed only of iron oxide.

The iron oxide group fluorine adsorbent/desorbent can adsorb the fluorine in an acid solution of pH 1.0 or more and less than 7.0 and desorb the fluorine in an alkaline solution of pH being more than 7.0 and being equal to 13.5 or less. The iron oxide group fluorine adsorbent/desorbent thus functions as a fluorine adsorbent/desorbent.

The iron oxide group fluorine adsorbent/desorbent adsorbs fluorine in an acid solution of pH 1.0 or more and less than 7.0 because, at a pH of less than 1.0, the fluorine adsorbent/desorbent is partly dissolved. On the other hand, at a pH of 7.0 or more, the fluorine adsorption capability falls.

On the other hand, the fluorine adsorbent/desorbent desorbs fluorine in an alkaline region of pH being more than 7.0 and being equal to 13.5 or less because a pH of less than 7.0 corresponds to an acid solution that is an inappropriate condition for desorbing fluorine from the fluorine adsorbent/desorbent. On the other hand, at a pH of more than 13.5, a very large amount of alkali may be required for pH adjustment. Further, the fluorine adsorbent/desorbent is modified and deteriorated to fall a re-adsorption capability. This prevents the repeated use of the fluorine adsorbent/desorbent.

4) Ferric Hydroxide Group Fluorine Adsorbent/Desorbent:

Ferric hydroxide is expressed by formula $Fe(OH)_3$.

The ferric hydroxide alone can be used as a fluorine adsorbent/desorbent. However, as described above, the ferric hydroxide may be provided with 0 or more wt % and 30 wt % or less of any of aluminum, titanium, zirconium or magnesium which has affinity for fluorine or a compound of any of aluminum, titanium, zirconium and magnesium (in this case, the wt % of the ferric hydroxide is 70 wt % or more and 100 wt % or less). Since the addition of aluminum or the like serves to provide an excellent fluorine adsorption and desorption capability, 1 wt % or more of any of the chemicals is preferably added. Here, 0 wt % or more and 30 wt % or less of aluminum or the like is added because the addition of more than 30 wt % increases costs owing to the expensive prices of these additives compared to those of iron and zinc group fluorine adsorbent/desorbents. When wt % of the ferric hydroxide is 100, no additives are used, that is, the fluorine adsorbent/desorbent is composed only of ferric hydroxide.

The ferric hydroxide group fluorine adsorbent/desorbent can adsorb the fluorine in an acid solution of pH 3.0 or more and less than 7.0 and desorb the fluorine in an alkaline solution of pH being more than 7.0 and being equal to 13.5 or less. The ferric hydroxide group fluorine adsorbent/desorbent thus functions as a fluorine adsorbent/desorbent.

The ferric hydroxide group fluorine adsorbent/desorbent adsorbs fluorine in an acid solution of pH 3.0 or more and less than 7.0 because, at a pH of less than 3.0, the fluorine adsorbent/desorbent is partly dissolved. On the other hand, at a pH of 7.0 or more, the fluorine adsorption capability falls.

On the other hand, the ferric hydroxide group fluorine adsorbent/desorbent desorbs fluorine in an alkaline solution of pH being more than 7.0 and being equal to 13.5 or less because a pH of less than 7.0 corresponds to an acid solution that is an inappropriate condition for desorbing fluorine from the fluorine adsorbent/desorbent On the other hand, at a pH of more than 13.5, a very large amount of alkali may be required for pH adjustment. Further, the fluorine adsorbent/desorbent is modified and deteriorated to fall a re-adsorption capability. This prevents the repeated use of the fluorine adsorbent/desorbent.

5) Basic Zinc Sulfate Group Fluorine Adsorbent/Desorbent:

Basic zinc sulfate is expressed by $(Zn(SO_4)_x(OH)_y$ (x and y are real numbers)).

The basic zinc sulfate alone can be used as a fluorine adsorbent/desorbent. However, as described above, the basic zinc sulfate may be provided with 0 wt % or more and 30 wt % or less of any of aluminum, titanium, zirconium or magnesium, which has a strong affinity for fluorine, or a compound of any of aluminum, titanium, zirconium and magnesium (in this case, the wt % of the basic zinc sulfate is 70 wt % or more and 100 wt % or less). Since the addition of aluminum or the like serves to provide an excellent fluorine adsorption and desorption capability, 1 wt % or more of any of the chemicals is preferably added. Here, 0 wt % or more and 30 wt % or less of aluminum or the like is added because the addition of more than 30 wt % increases costs owing to the expensive prices of these additives compared to those of iron and zinc group fluorine adsorbent/desorbents. When wt % of the basic zinc sulfate is 100, no additives are used, that is, the fluorine adsorbent/desorbent is composed only of basic zinc sulfate.

The basic zinc sulfate group fluorine adsorbent/desorbent adsorbs fluorine in an acid solution of pH 4.0 or more and less than 7.0 because, at a pH of less than 4.0, the fluorine adsorbent/desorbent is partly dissolved. On the other hand, at a pH of 7.0 or more, the fluorine adsorption capability falls.

On the other hand, the fluorine adsorbent/desorbent desorbs fluorine in an alkaline solution of pH being more than 7.0 and being equal to 13.5 or less because a pH of less than 7.0 corresponds to an acid solution that is an inappropriate condition for desorbing fluorine from the fluorine adsorbent/desorbent. On the other hand, at a pH of more than 13.5, a very large amount of alkali may be required for pH adjustment. Further, the fluorine adsorbent/desorbent is modified and deteriorated to fall a re-adsorption capability. This prevents the repeated use of the fluorine adsorbent/desorbent.

Any of the fluorine adsorbent/desorbents 1) to 5) may be used in mixture or in a morphous (or colloidal) form. Further, the fluorine adsorbent/desorbent may be an amorphous (or colloidal) precipitate of iron or zinc containing a hydroxyl group $OH^-$ or sulfate group $SO_4^{2-}$. Furthermore, the main components of the fluorine adsorbent/desorbent may contain crystal water. Moreover, it is possible to use mixture of any of aluminum, titanium, zirconium, magnesium and copper (only for the oxy iron hydroxide group fluorine adsorbent/desorbent), which are additives, or a compound of any of these additives.

Further, the fluorine adsorbent/desorbents according to the present invention have high fluorine desorption ratios (see the examples). Accordingly, after fluorine is desorbed from the fluorine adsorbent/desorbents in the alkaline solution, the fluorine adsorbent/desorbents can be reused to adsorb fluorine. Consequently, the fluorine adsorbent/desorbents are reused and recycled during a process for removing fluorine.

<Method for Manufacturing Fluorine Adsorbent/Desorbent>

Method for manufacturing the above shown fluorine adsorbent/desorbent will be described below. The method for manufacturing each of the fluorine adsorbent/desorbents according to the present invention is not limited to the manufacturing conditions described below. Various changes may be made to these conditions by those skilled in the art.

1) Method for Manufacturing a Basic Iron Sulfate Group Iron Compound $(Fe(OH)_x(SO_4)_y)$:

A zinc sulfate solution containing ferric sulfate (the concentration of Fe is 10 g/L or more and 30 g/L or less) at the temperature of 30° C. or more and less than 100° C. is adjusted its pH 2.5 or more and 4.5 or less to precipitate a basic iron sulfate iron group compound. Then, the solution is separated into a solid and a liquid to obtain the basic iron sulfate iron group compound.

FIG. 1 shows a photograph of a TEM image (about 10,000× magnification) of one example of the basic iron sulfate group iron compound obtained.

2) Method for Manufacturing Oxy Iron Hydroxide:

2-1) Method for Manufacturing Akaganeite (β-FeOOH);

For Akaganeite, 0.5 mol/L or more and 2 mol/L or less of ferrous chloride solution is stirred while heated 60° C. or more and lower than 100° C. Air is blown into the solution at a flow rate of about 2 L/min or more and about 10 L/min or less per one-litter of ferrous chloride solution. After reaction time for about six hours in solution, the solution is separated into a solid and a liquid to obtain Akaganeite (β-FeOOH).

Figure 2:
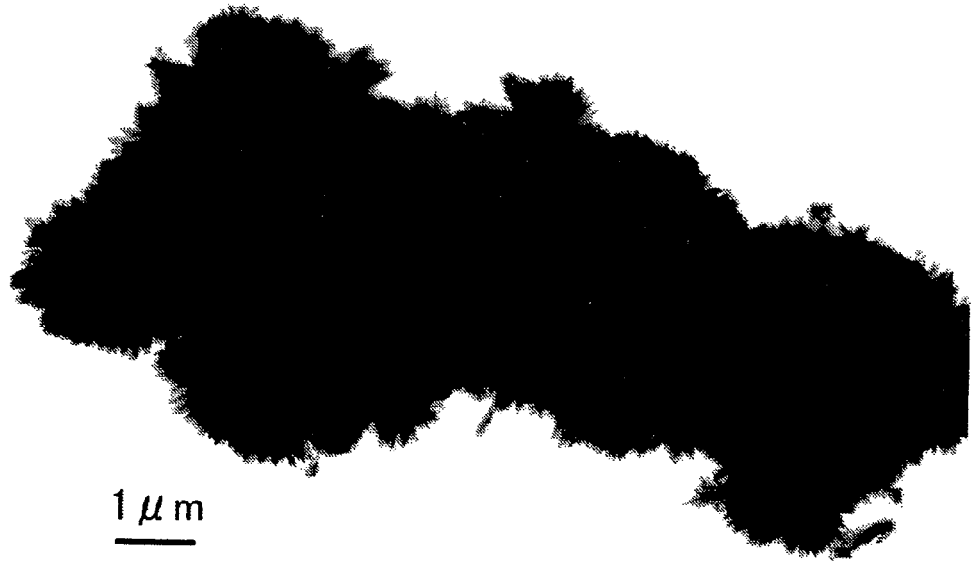
FIG. 2 is an example of a photograph of a TEM observation on "Akaganeite" of oxy iron hydroxide according to the present invention (about 10,000× magnification)

FIG. 2 shows a photograph of a TEM image (about 10,000× magnification) of one example of the Akaganeite obtained.

As shown in the TEM image in FIG. 2, bur-shaped Akaganeite can be generated which is similar to burs of a chestnut or a sea urchin. However, the Akaganeite can be formed like a bar, for example, depending on the manufacturing conditions.

2-2) Method for Manufacturing Goethite (α-FeOOH);

A zinc sulfate solution containing ferrous sulfate (Fe concentration: 1 g/L or more and 30 g/L or less) is stirred at a pH of 2.5 or more and 4.5 or less, and 30° C. or more and 100° C. or less. At the same time, air is blown into the solution at a flow rate of about 2 L/min or more and about 10 L/min or less per one-litter of solution. After reaction time for about six hours in solution, the solution is separated into a solid and a liquid to obtain Goethite (α-FeOOH).

Figure 3:
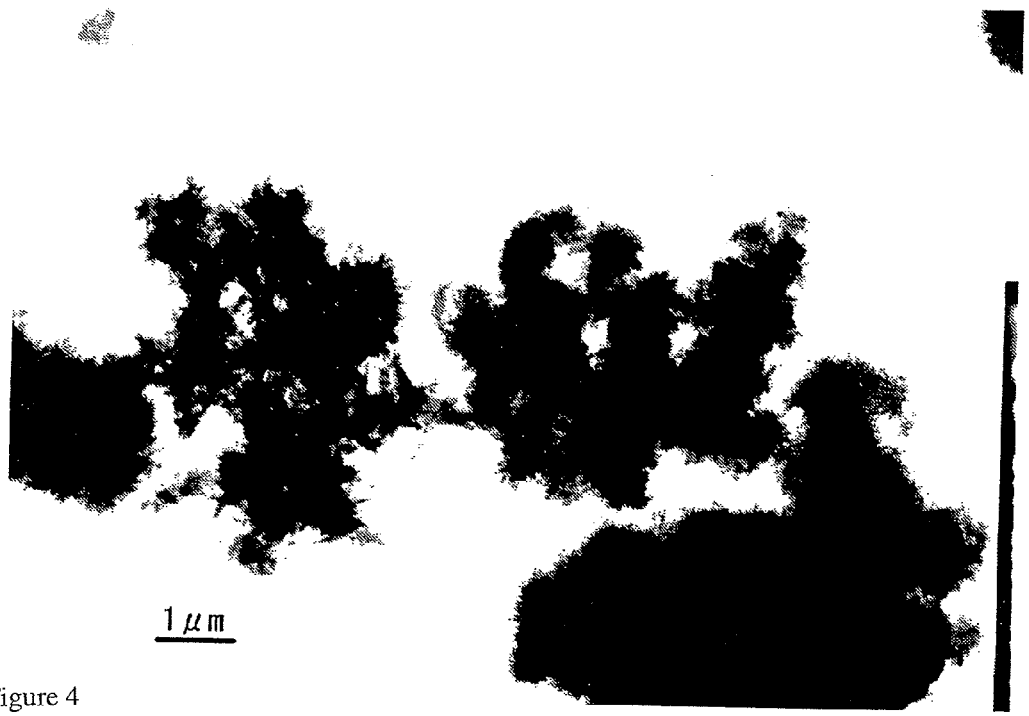
FIG. 3 is an example of a photograph of a TEM observation on "Goethite" of oxy iron hydroxide according to the present invention (about 10,000× magnification)

FIG. 3 shows a photograph of a TEM image (about 10,000× magnification) of one example of the Goethite obtained.

3) Method for Manufacturing Iron Oxide (Hematite; $\alpha$-$Fe_2O_3$):

About 0.5 mol/L of ferric chloride solution is dripped into about 1 mol/L of sodium hydroxide solution at 80 to 100° C. The solution is thus adjusted to have a pH of about 8 or more and about 10 or less. The solution is heated at 80 to 100° C. and kept for about 24 hours for reaction. Then, the solution is separated into a solid and a liquid to obtain Hematite ($\alpha$-$Fe_2O_3$).

Figure 4:
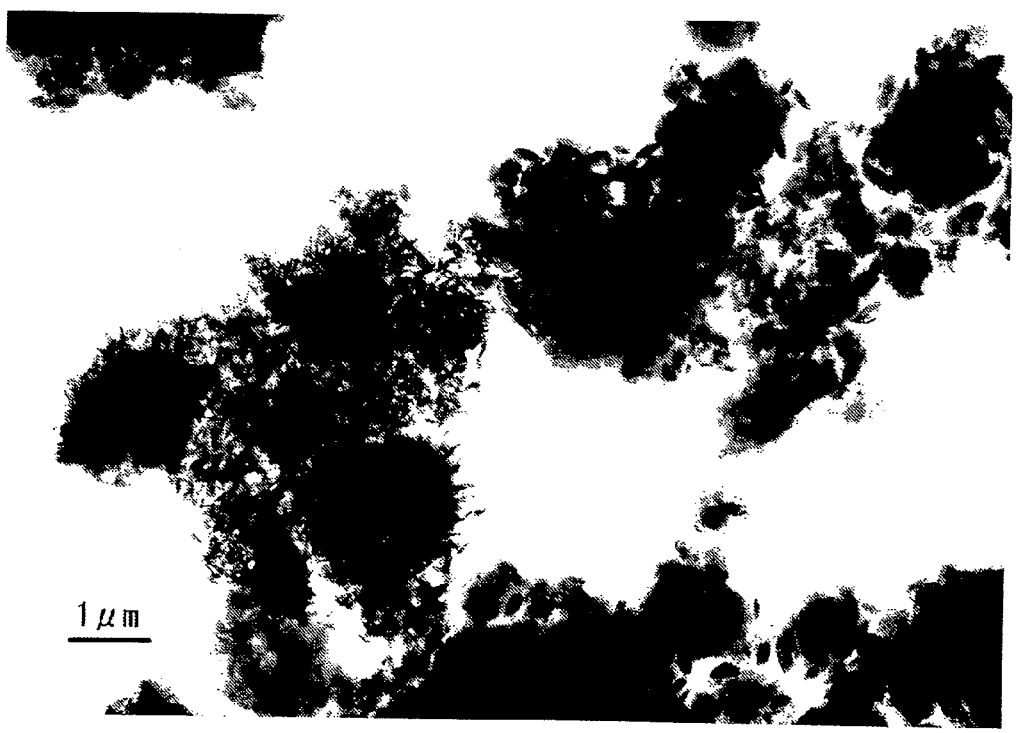
FIG. 4 is an example of a photograph of a TEM observation on "Hematite" of iron oxide according to the present invention (about 10,000× magnification)

FIG. 4 shows a photograph of a TEM image (about 10,000× magnification) of one example of the Hematite obtained.

4) Method for Manufacturing Ferric Hydroxide:

About 0.1 mol/L of sodium hydroxide is put into about 0.1 to 0.3 mol/L of ferric nitrate solution with stirring to adjust pH of about 1 to 2. Then, the solution is dripped into 0.5 to 1.5 mol/L of sodium hydroxide solution with stirring. The precipitate generated is sufficiently rinsed with water. Then, the solution is separated into a solid and a liquid to obtain ferric hydroxide.

Figure 5:
FIG. 5 is an example of a photograph of a TEM observation on "ferric hydroxide" according to the present invention (about 10,000× magnification).

FIG. 5 shows a photograph of a TEM image (about 10,000× magnification) of one example of the ferric hydroxide obtained.

5) Method for Manufacturing Basic Zinc Sulfate:

About 0.8 to 6.0 mol/L of sodium hydroxide solution is put into about 1.0 to 3.0 mol/L of zinc sulfate solution at 60 to 95° C. with stirring to adjust pH of about 4.0 or more and about 7.0 or less. Then, the precipitate generated is separated into a solid and a liquid to obtain basic zinc sulfate.

<Method for Removing Fluorine by Using a Fluorine Adsorbent/Desorbent>

The best embodiment of a method for removing fluorine by using the above fluorine adsorbent/desorbent will be described below.

The best embodiment of the present invention is a method comprising a step of removing fluorine from a zinc electrolytic solution containing fluorine, the method preferably comprising:

a fluorine adsorption step a of adsorbing fluorine to a basic iron sulfate group fluorine adsorbent/desorbent;

a first solid/liquid separating step b of separating the solution obtained in the step a into a solid and a liquid;

a fluorine desorption step c of introducing the solid resulting from the solid-liquid separation in the step b into an alkaline solution to desorb the fluorine from the fluorine adsorbent/desorbent;

a second solid/liquid separating step d of separating the solution obtained in the step c into a solid and a liquid; and a fluorine adsorbent/desorbent reuse step e of sending back the solid resulting from the solid-liquid separation in the step d or a solution after dissolving the solid in an acid solution, to the step a as the fluorine adsorbent/desorbent for the step a. Here, the method may include a "step of transferring the liquid resulting from the solid-liquid separation in the step b as a zinc electrolytic solution". Thus, the solution can be transferred to the next step in the form of an electrolytic solution in which fluorine has been removed from the solution so that its concentration is a predetermined value or less.

Moreover, the method for removing fluorine may include:

a step f of introducing an alkali earth metal compound into the liquid separated in the step d for reaction of the alkali earth metal compound with fluorine to precipitate alkali earth metal fluoride;

a third solid/liquid separating step g of separating the solution obtained in the step f into a solid and a liquid, and an alkaline solution reuse step h of sending back the liquid separated in the step g to the step c in the form of an alkaline solution put in the step c.

Now, a method for preparing a zinc electrolytic solution will be described in brief as a precondition. Subsequently, the steps a to c of the present invention will be described. Further, the steps f to h will be additionally described. Method for preparing zinc electrolytic solution:

First, the zinc containing material is dissolved into 300 g/L or less of sulfuric acid solution to prepare a zinc containing material solution which contains at least fluorine and zinc. A zinc containing materials are obtained from recovery process executed on steel dust exhausted during a steel making process or zinc residues resulting from a zinc plating process or the like. The acid solution may be an electrolytic solution that is a sulfuric acid solution containing zinc. Accordingly, the present invention can perform big reduction in material costs because of the use as a raw material of the zinc containing material containing at least fluorine and zinc and obtained by executing a recovery process on steel dust exhausted during a steel making process or zinc residues resulting from zinc plating process or the like.

Description of Steps a to h:

1) The step a is a "fluorine adsorption step of adsorbing fluorine to the fluorine adsorbent/desorbent".

In the step a, fluorine in the zinc containing material solution is adsorbed to the fluorine adsorbent/desorbent. Here, the fluorine adsorbent/desorbent is preferably any of the above described basic iron sulfate group iron compound, oxy iron hydroxide, iron oxide, ferric hydroxide, or basic zinc sulfate or a mixture of any of these compounds, or the fluorine adsorbent/desorbent to which aluminum, titanium, zirconium, magnesium or copper (only for oxy iron hydroxide) or a compound of any of these elements is added. The conditions such as pH for the adsorption and desorption of the fluorine adsorbent/desorbent have already been described. Accordingly, the description is omitted.

2) The step b is a "first solid/liquid separating step of separating the solution obtained in the step a into a solid and a liquid".

In the step b, the solution obtained in the step a is separated into a solid and a liquid using the popular method. The solid is transferred to the next step c.

Here, the process may include a "step of transferring the liquid resulting in the step b as a zinc electrolytic solution". Thus, the solution can be transferred to the next step in the form of an electrolytic solution in which fluorine has been removed from the solution so that its concentration is a predetermined value or less.

Further, as already described, the fluorine adsorbent/desorbent may be amorphous (or colloidal) while in use. Alternatively, the fluorine adsorbent/desorbent may be an amorphous (or colloidal) precipitate of iron or zinc containing a hydroxyl group $OH^-$ or sulfate group $SO_4^{2-}$. Alternatively, the fluorine adsorbent/desorbent may contain crystal water while in use.

3) The step c is a "fluorine desorption step of introducing the solid resulting from the solid-liquid separation in the step b into an alkaline solution to desorb the fluorine from the fluorine adsorbent/desorbent".

In the step c, the solid resulting from the solid-liquid separation in the step b is introduced into an alkaline solution containing sodium hydroxide or the like to desorb the fluorine from the fluorine adsorbent/desorbent. The fluorine adsorbent/desorbent for use may be with high fluorine desorption ratio described above. Further, in this case, the fluorine is preferably desorbed in an alkaline solution with a pH of more than 7.0 and being equal to 13.5 or less and further preferably of 9.0 or more and being equal to 12.0 or less.

4) The step d is a "second solid/liquid separating step of separating the solution obtained in the step c into a solid and a liquid.

In the step d, the solution obtained in the step c is separated into a solid and a liquid using the popular method.

5) The step e is a "fluorine adsorbent/desorbent reuse step of sending back the solid resulting from the solid-liquid separation in the step d or a solution after dissolving the solid in an acid solution, to the step a as the fluorine adsorbent/desorbent for the step a. During the sending back, the solid may be temporarily stored and an appropriate amount of fluorine adsorbent/desorbent may be sent to the step a depending on request.

Moreover, in an embodiment of the method for removing fluorine, the solution after dissolving the solid obtained in the step d in an acid solution may be sent to the step a as a fluorine adsorbent/desorbent in the step e.

More specifically, if the fluorine adsorbent/desorbent contains basic iron sulfate group iron compound, ferric hydroxide and basic zinc sulfate, the fluorine adsorbent/desorbent can be sent back to step a after dissolving into an acid solution of pH less than 2.0 to convert, for example, an iron compound into trivalent iron ions $Fe^{3+}$ or a zinc compound into bivalent zinc ions $Zn^{2+}$.

Moreover, the steps f to h may be added.

6) In the step f, an alkali earth metal compound is put into the liquid separated in the step d for reaction of the alkali earth metal compound with fluorine to precipitate alkali earth metal fluoride. The alkali earth metal compound is suitably calcium hydroxide or sulfate. Therefore, the precipitated alkali earth metal fluoride is calcium fluoride. The calcium fluoride can be used for other applications as a by-product of the fluorine removing step.

7) In the step g, the solid of alkali earth metal fluoride, for example, calcium fluoride, and the alkaline liquid, for example, sodium hydroxide solution, obtained in the step f are separated.

8) In the step h, the separated liquid in the step g can be sent back to the step c in the form of an alkaline solution put in the step c. This enables an alkaline solution such as sodium hydroxide to be reused. During the sending back, the alkaline solution can be temporarily stored and an appropriate amount may be sent to the step c depending on request.

In the above described best embodiment of a method for removing fluorine, if the fluorine adsorbent/desorbent contains a basic iron sulfate group iron compound, in a solution with a pH region of pH 3.0 or more and less than 7.0, the basic iron sulfate group iron compound may adsorb not only fluorine but also a sulfate group and zinc in the step a. Accordingly, the sulfate group and zinc must be pre-removed. After the removal, the fluorine is preferably removed from the fluorine adsorbent/desorbent in a pH region of pH being more than 7.0.

This is characteristic of the basic iron sulfate group fluorine adsorbent/desorbent. By using the above process to remove the sulfate group and zinc adsorbed to the basic iron sulfate group fluorine adsorbent/desorbent, from the fluorine adsorbent/desorbent in a solution with a pH region of pH 3.0 or more and less than 7.0 before desorption of fluorine, it can possibly reduce the amount of calcium sulfate (gypsum) generated during a fluorine recovery step.

Moreover, the above described best embodiment of a method for removing fluorine may include a step of passing the liquid resulting from the solid-liquid separation in the step d through a anion exchange resin to allow the anion exchange resin to adsorb anions such as fluorine to regenerate an alkaline solution.

The anion exchange resin is well-known. When passed through a column filled with hydroxide ions, the anion exchange resin emits hydroxide ions, while adsorbing and removing anions such as fluorine in the solution which may cause problems in a zinc refining process. Moreover, the anion exchange resin can be used by regenerating, for example, a high concentration of sodium hydroxide solution (1 mol/L). That is, adsorbed anions are exchanged with hydroxide ions and eluted into the high concentration of sodium hydroxide. As a result, an anion exchange resin can be regenerated, and a high concentration fluorine ion can be recovered. Further, the high concentration fluorine ion enables high-grade calcium fluoride to be generated.

EXAMPLES

In Examples 1 to 4 described below, adsorption and desorption tests on fluorine were carried out on a leached solution (zinc oxide leached solution) with a fluorine concentration of 70 mg/L.

The concentration of fluorine in the solution was analyzed by using the method described below. First, 5 ml of solution containing fluorine was sampled from the solution and put into a 100-mL beaker. Then, 20 mL of sodium citrate of 1 mol/L was put into the solution and stirred. After these adjustments, 40 mL of EDTA-2Na solution of 0.5 mol/L was put into the solution and stirred. The solution pH was then adjusted to be 8 by using sodium hydroxide solution of 10 wt % or sulfuric acid solution of 1.8 mol/L. The solution adjusted was transferred to a 100-mL messflask. Then, the pure water was put into arrange the total solution volume to 100 mL. The volume arranged solution was then transferred to a beaker. A fluoride ion selective electrode was inserted into the beaker and the potential was measured. Then, the concentration of fluorine was determined by using a calibration curve indicating the relationship between the potential and the fluorine concentration to determine the fluorine concentration. Calibration curve is prepared by measuring potential against standard reagent for fluorine concentration (this procedure applies to all the examples described below).

To evaluate the capability of adsorbing fluorine, the solution obtained by dissolving a zinc containing material which is recovered from zinc residues resulting from steel dust exhausted during a steel making process containing at least fluorine and zinc in an acid solution, (in the present application, the solution is called an "leached solution" or "zinc oxide leached solution") was used. Table 1 shows an example of the composition of a solution having a fluorine concentration of 70 mg/L according to the present example. In the examples described below, solutions have higher fluorine concentrations because a mass production scale is a precondition. (The concentration of fluorine in the solution before fluorine removal will be called a "leached solution concentration" below.)

TABLE 1

| Composition of leached solution (zinc oxide leached solution) | | | | | | | | | |
|---|---|---|---|---|---|---|---|---|---|
| Element | Zn | F | As | Sb | Ge | Fe | Sn | Si | Cd Cu |
| Concentration | 160 | 70 | 2.8 | 43 | 1.8 | 285 | 0.54 | 92 | 613 0.6 |

(Unit: g/L for Zn, Sn and Cu, and mg/L for the other elements)

Example 1

<With Basic Iron Sulfate Group Fluorine Adsorbent/Desorbent>

In Example 1, a basic iron sulfate group fluorine adsorbent/desorbent was put into a zinc oxide leached solution with a fluorine concentration of 70 mg/L (for the composition, see Table 1) with an iron/fluorine value (Fe/F value) to be 100, 300 or 500. The solution was heated at 60° C. and stirred. Further, the solution was maintained at a pH of 3.5. Two hours later, the solution was separated into a solid and a liquid. The concentration of fluorine in the filtrate was then analyzed. The Fe in the Fe/F value is the weight of iron contained in the basic iron sulfate group fluorine adsorbent/desorbent. Hence, examinations were made to research amount of fluorine adsorbed varied with an increase in the amount of basic iron sulfate group fluorine adsorbent/desorbent against fluorine. The results are shown in Table 2.

Here, the adsorbed or desorbed fluorine amount (mg/g) to the fluorine adsorbent/desorbent is defined by the amount (mg) of fluorine (F) per litter of solution with respect to the weight (g) of iron (Fe) or zinc (Zn) in the fluorine adsorbent/desorbent put into 1 L of solution (this also applies to the description below).

Further, in the example according to the present invention, the Fe/F value is a parameter value representing the amount of adsorbent/desorbent used in a process for adsorbing or desorbing fluorine using the fluorine adsorbent/desorbent. This value represents the ratio of the amount of iron (Fe) or zinc (Zn) contained in the fluorine adsorbent/desorbent used to the amount (g) of fluorine (F) contained in the leached solution, the amount being calculated from the F analytical value of the leached solution. The Fe/F value or Zn/F value can indicates the required amount of fluorine adsorbent/desorbent for fluorine adsorbed and desorbed in each example or the amount of fluorine adsorbent/desorbent used in the example (hereinafter the same).

TABLE 2

Adsorption test results

| Fe/F value | 100 | 300 | 500 |
|---|---|---|---|
| Final F concentration (mg/L) | 19 | 11 | 7 |

Table 2 shows that the fluorine concentration of lower than 20 mg/L can be achieved at an Fe/F value of 100 and fluorine concentration falls as the Fe/F value increases to 300 and then to 500, that is, as the amount of basic iron sulfate group fluorine adsorbent/desorbent increases.

Then, to desorb the fluorine from the fluorine adsorbent/desorbent having adsorbed fluorine at Fe/F value of 100, a fluorine adsorbent/desorbent is put into a solution adjusted to be a pH of 10 to 11 by using sodium hydroxide. The solution was stirred at 60° C. and kept reacting for tow hours. Table 3 shows the desorption ratio of fluorine from the fluorine adsorbent/desorbent.

TABLE 3

Desorption test results

| pH | 11 | 10 |
|---|---|---|
| Desorption ratio (%) | 99 | 98 |

Table 3 shows that fluorine can be desorbed in an alkaline solution with a pH of 10 to 11.

Then, the fluorine adsorbent/desorbent having desorbed fluorine is put again into the leached solution having a fluorine concentration of 70 mg/L. The solution was stirred at a liquid temperature of 60° C. and a pH of 3.5 and kept reacting for two hours. The solution was separated into a solid and a liquid. The concentration of fluorine in the filtrate was analyzed. Table 4 shows the fluorine concentration after the first and second (after regenerating) adsorption at a Fe/F value of 100.

TABLE 4

Repeated adsorption test results

| | First | Second |
|---|---|---|
| Final F concentration (mg/L) | 18.9 | 19.6 |

Table 4 shows little difference in the amount of fluorine adsorbed between the first test and the second test. Hence, the fluorine adsorbent/desorbent reused has an adsorption capability similar to that of a fresh fluorine adsorbent/desorbent. Consequently, the fluorine adsorbent/desorbent can be reused. Further, a target fluorine concentration of 20 mg/L or less was achieved.

<With Basic Iron Sulfate Group Fluorine Adsorbent/Desorbent>

A zinc sulfate solution containing ferric sulfate (Fe concentration of 20 g/L) was neutralized and adjusted to have a pH of 3.5 at a liquid temperature of 80° C. Thus, a basic iron sulfate group fluorine adsorbent/desorbent was precipitated. The slurry was filtered to obtain a cake. The cake was put into a zinc oxide leached solution with a fluorine concentration of 70 mg/L with the Fe/F value of 500. The solution was stirred and maintained at 60° C. at a pH of 3.5. Two hours later, the solution was separated into a solid and a liquid. The fluorine in the filtrate was analyzed.

Then, in order to desorb the fluorine from the basic iron sulfate group fluorine adsorbent/desorbent having adsorbed fluorine, basic iron sulfate was put into a solution adjusted to have a pH of 11 by using sodium hydroxide. The solution was stirred and maintained at 60° C. and then kept to react for two hours followed by solid/liquid separation.

Then, the basic iron sulfate free from fluorine was dissolved into an electrolytic solution for zinc refining containing 150 g/L of sulfate solution. The solution containing ferric iron ions was put into a zinc oxide leached solution with a fluorine concentration of 70 mg/L with the Fe/F value of 500. The solution was then stirred and maintained at 60° C. and at a pH of 3.5 and then kept to react for two hours followed by solid/liquid separation. The fluorine in the filtrate was then analyzed. Table 5 shows the results of the first and second adsorptions. The first and second tests show almost the same amount of fluorine adsorbed.

TABLE 5

Re-adsorption test results after dissolution of basic iron sulfate

| | First | Second |
|---|---|---|
| Final F concentration (mg/L) | 7 | 6 |

Table 5 shows that the target fluorine concentration of 20 mg/L was achieved in both the first and second tests, indicating a sufficient fluorine adsorption capability. After the fluorine desorption, the fluorine adsorbent/desorbent was dissolved in an acid solution and sent back to the adsorbing step as iron ions. It was then found again that the fluorine adsorbent/desorbent can be reused.

Example 2

<With Oxy Iron Hydroxide Group Fluorine Adsorbent/Desorbent (Akaganeite)>

Akaganeite ($\beta$-FeOOH), oxy iron hydroxide, was put into the leached solution with a fluorine concentration of 70 mg/L with the Fe/F value of 160.

The solution was heated up to 80° C. and stirred. The solution was then maintained at a pH of 2.5 for two hours. Then, the solution was separated into a solid and a liquid. The filtrate was analyzed for fluorine concentration.

In the first fluorine desorption process, a precipitate filtered after the adsorption was put into a solution at a liquid temperature of 80° C. which has been adjusted to have a pH of 10 to 12. The solution was then stirred with its pH maintained. Two hours later, the solution was separated into a solid and a liquid. The filtrate was analyzed.

A filtered precipitate resulting from the fluorine desorption process was put into the leached solution with a fluorine concentration of 70 mg/L as a fluorine adsorbent/desorbent for the second adsorbing process as described above to adsorb fluorine and the filtrate was analyzed in same way. Tables 6 and 7 show the results of the third to fifth fluorine adsorption and desorbing processes further carried out using similar operations.

As the results of the repeated tests, table 6 shows that the concentration of fluorine in the solution after reaction was 19 mg/L or less, which is less than the target fluorine concentration of 20 mg/L.

On the other hand, for fluorine desorption, Table 7 shows that the desorption ratio was substantially close to 100% in all of the first to fourth tests. It is thus found that the above process allows the fluorine adsorbent/desorbent to almost perfectly desorb the fluorine to substantially return the fluorine adsorbent/desorbent to its fresh state. That is, the fluorine adsorbent/desorbent can be repeatedly used without causing any problems. This indicates that the oxy iron hydroxide group fluorine adsorbent/desorbent (Akaganeite) has a sufficient fluorine adsorption and desorption capability and can be reused. In Table 7, the desorption ratio of more than 100% may be resulted from the desorption of fluorine not desorbed during the preceding fluorine desorption or analytical accuracy.

TABLE 6

Adsorption test results

| | F concentration of leached solution mg/L | Final F concentration mg/L | Amount of F adsorbed Mg/g |
|---|---|---|---|
| First adsorption | 60.4 | 15.2 | 5.4 |
| Second adsorption | 69.1 | 13.3 | 6.6 |
| Third adsorption | 65.3 | 10.9 | 6.5 |
| Fourth adsorption | 63.3 | 17.1 | 5.5 |
| Fourth adsorption | 64.8 | 18.9 | 5.4 |

TABLE 7

| Condition | pH | Desorption ratio % | Amount of F desorbed mg/g |
|---|---|---|---|
| First desorption | 12 | 100.6 | 5.4 |
| Second desorption | 12 | 98.0 | 6.5 |
| Third desorption | 12 | 118.1 | 7.6 |
| Fourth desorption | 12 | 96.5 | 5.3 |

A 1.5-times equivalent amount of calcium hydroxide for the fluorine in the solution based on the analytical value was put into a desorbed solution (sodium hydroxide solution) after a fluorine desorption process. One hour later, the solution was separated into a solid and a liquid. The filtrate was analyzed.

The results are shown in Table 8. The table shows that the concentration of fluorine in the desorbed solution falls. It indicates that about 80% of the fluorine was removed in the form of calcium fluoride in a solid alkali earth metal fluoride. A filtrate of the desorbed solution (sodium hydroxide solution) can be reused as an alkaline solution for a fluorine removing process.

TABLE 8

Calcium fluoride regenerating test results

| Desorbed solution (F concentration mg/L) | After addition of Ca(OH)$_2$ (F concentration mg/L) | Removal ratio (%) |
|---|---|---|
| 95.0 | 22.0 | 76.8 |
| 147.0 | 25.0 | 83.0 |
| 155.0 | 26.0 | 83.2 |

Example 3

<With Oxy Iron Hydroxide Group Fluorine Adsorbent/Desorbent (Akaganeite) Containing a Copper Component>

In Example 3, Akaganeite ($\beta$-FeOOH) containing a copper component (1%) was put into a zinc oxide leached solution with a fluorine concentration of 70 mg/L with the Fe/F value of 160 against amount of fluorine. The solution was heated at 80° C. and stirred. Further, the solution was maintained at a pH of 2.5 for two hours. Then, the solution was separated into a solid and a liquid. The concentration of fluorine in the filtrate was then analyzed. A filtered precipitate was put into a sodium hydroxide solution adjusted to have a liquid temperature of 80° C. and a pH of 10 to 12. The pH of the solution was maintained. Two hours later, the solution was separated into a solid and a liquid with the concentration of fluorine in the filtrate analyzed. Tables 9 and 10 show the results of repeated similar tests.

The results of the repeated tests show lower value than the target concentration of fluorine in the solution of 20 mg/L was achieved after reaction (fluorine adsorption) as shown in Table 9. Further, Table 10 shows that the desorption ratio was substantially 100% in all of the first to fourth tests. It is thus found that the above process allows the oxy iron hydroxide group fluorine adsorbent/desorbent to almost perfectly desorb the fluorine to substantially return the oxy iron hydroxide fluorine adsorbent/desorbent (Akaganeite) to its fresh state. That is, the fluorine adsorbent/desorbent can be repeatedly used without causing any problems and has an excellent fluorine adsorption capability. Furthermore, compared to Example 2, Example 3 is effective because addition of copper improves the fluorine adsorption capability (the amount of fluorine adsorbed).

TABLE 9

| | F concentration of leached solution mg/L | Final F concentration mg/L | Amount of F adsorbed Fe/F (mg/g) |
|---|---|---|---|
| First adsorption | 60.4 | 13.5 | 5.6 |
| Second adsorption | 69.1 | 10.2 | 7.0 |
| Third adsorption | 65.3 | 11.6 | 6.4 |
| Fourth adsorption | 63.3 | 15.1 | 5.7 |
| Fifth adsorption | 64.8 | 14.2 | 7.2 |

TABLE 10

|  | pH | Desorption ratio % | Amount of F desorbed mg/g |
|---|---|---|---|
| First desorption | 12 | 94.6 | 5.3 |
| Second desorption | 12 | 102.3 | 7.2 |
| Third desorption | 12 | 106.7 | 6.8 |
| Fourth desorption | 12 | 100.6 | 5.7 |

Example 4

<With Oxy Iron Hydroxide Group Fluorine Adsorbent/Desorbent (Goethite)>

A zinc sulfate solution containing ferrous sulfate was oxidized by using $H_2O_2$ at a pH of 3.5 and a liquid temperature of 80° C. to precipitate Goethite (α-FeOOH).

The slurry was then filtered to obtain a cake. The cake was put into a zinc oxide leached solution with a fluorine concentration of 70 mg/L with the Fe/F values of 100, 300, or 500. The solution was heated up to 60° C. and then stirred and maintained at a pH of 3.5. Two hours later, the solution was separated into a solid and a liquid. The filtrate was then analyzed. The results are shown in Table 11.

TABLE 11

| Adsorption test results | | | |
|---|---|---|---|
| Fe/F value | 100 | 300 | 500 |
| Final F concentration (mg/L) | 20.0 | 12.0 | 6.0 |

Then, in order to desorb the fluorine from the fluorine adsorbent/desorbent having adsorbed fluorine, a fluorine adsorbent/desorbent was put into a solution adjusted to have a pH of 10 to 11 by using sodium hydroxide. The solution was stirred at a liquid temperature of 60° C. with its pH adjusted. This state was maintained to allow reaction for two hours. The desorption ratio of fluorine is shown in table 12. The results indicate that the desorption ratio of fluorine in the oxy iron hydroxide group fluorine adsorbent/desorbent (Goethite) was almost 100% in a pH region of pH 10 to 11.

TABLE 12

| Desorption test results | | |
|---|---|---|
| pH | 11 | 10 |
| Desorption ratio (%) | 99 | 96 |

The oxy iron hydroxide group fluorine adsorbent/desorbent (Goethite) from which fluorine has been desorbed was put into a zinc oxide leached solution with a fluorine concentration of 70 mg/L with the Fe/F value of 100. The solution was stirred and maintained at 60° C. and a pH of 3.5 for two hours. After reaction, the solution was filtered and the fluorine in the filtrate was analyzed. Table 13 shows the first fluorine concentration analysis and the fluorine concentration analysis after regenerating (second analysis). The results show that with the oxy iron hydroxide group fluorine adsorbent/desorbent (Goethite), there is no difference in fluorine adsorption amount between the first test and the second test. It is thus found that the oxy iron hydroxide group fluorine adsorbent/desorbent can achieve the target fluorine concentration of 20 mg/L or less and thus has a sufficient adsorbing and desorption capability. This indicates that the oxy iron hydroxide group fluorine adsorbent/desorbent (Goethite) in Example 4 can be reused. Further, Tables 14 to 16 show that the desorption ratio was almost 100% in all of the first to third tests.

TABLE 13

| Repeated adsorption test results | | |
|---|---|---|
|  | First test | Second test |
| Final F concentration(m/L) | 20 | 17 |

TABLE 14

| Adsorption and desorption test results (first test) | |
|---|---|
| Final F concentration(m/L) | 11 |
| Desorption ratio (%) | 95.6 |

TABLE 15

| Adsorption and desorption test results (repeated use, second test) | |
|---|---|
| Final F concentration(m/L) | 10 |
| Desorption ratio (%) | 100 |

TABLE 16

| Adsorption and desorption test results (repeated use, third test) | |
|---|---|
| Final F concentration(m/L) | 12 |
| Desorption ratio (%) | 98.5 |

In Examples 1 to 4, the concentration of the leached solution was 70 mg/L. However, in the embodiments below, the leached solution with a higher fluorine concentration of 200 mg/L or more was used.

Example 5

In Example 5, five types of fluorine adsorbent/desorbents (except the basic zinc sulfate group fluorine adsorbent/desorbent) was put into 200 mg/L of leached solution with the Fe/F values of 150, 200 or 300 without additives such as aluminum in the fluorine adsorbent/desorbents. The fluorine adsorbent/desorbents were heated up to 60° C. and then stirred and maintained at a pH of 4.0 (however, pH was 2.5 only for (β-FeOOH). Two hours later, the solution was separated into a solid and a liquid. Then, a filtrate was obtained and the amount of fluorine (mg/L) in the solution after fluorine adsorption was checked. The results are shown in Table 17.

TABLE 17

Fe/F value vs. fluorine concentration
(mg/L) after fluorine adsorption

| Fluorine adsorbent/desorbent | | Fe/F value | | |
|---|---|---|---|---|
| Type | Formula | 150 | 200 | 300 |
| Basic iron sulfate group | $Fe(SO_4)_x(OH)_y$ | 17.5 | 14.8 | 9.0 |
| | $FeO_a(OH)_b(SO_4)_c(H_2O)_d$ | 18.2 | 15.6 | 10.2 |
| Oxy iron hydroxide group | $\alpha\text{-FeOOH}$ | 19.0 | 13.9 | 6.4 |
| | $\beta\text{-FeOOH}$ | 6.8 | 4.7 | 2.0 |
| Iron oxide group | $Fe_2O_3$ | 21.1 | 17.0 | 8.7 |
| Ferric hydroxide group | $Fe(OH)_3$ | 26.0 | 22.0 | 16.0 |

* Concentration in leached solution is 200 mg/L, without additional elements

The basic zinc sulfate group fluorine adsorbent/desorbent was put into an leached solution of concentration 200 mg/L with a Zn/F values of 150, 200 or 300, and the amount of fluorine adsorbed (mg/L) was examined as described above. The results are shown in Table 18. Further, Tables 17 and 18 indicate that the oxy iron hydroxide group fluorine adsorbent/desorbent of Akaganeite ($\beta$-FeOOH) has the best fluorine adsorption capability.

TABLE 18

Zn/F value vs. fluorine concentration
(mg/L) after fluorine adsorption

| Fluorine adsorbent/desorbent | | Zn/F value | | |
|---|---|---|---|---|
| Type | Formula | 150 | 200 | 300 |
| Basic iron sulfate group | $Zn(SO_4)_x(OH)_y$ | 89.0 | 55.0 | 16.0 |

* Concentration in leached solution is 200 mg/L, without additional elements

Table 17 shows that the basic iron sulfate- or oxy iron oxide group fluorine adsorbent/desorbent can achieve the target fluorine concentration of 20 mg/L at a Fe/F value of 150. Table 17 further shows that increasing the Fe/F value to 300 enables all the fluorine adsorbent/desorbents to achieve the target fluorine concentration of 20 mg/L or less. Further, Table 18 shows that an increase in Zn/F value improves the fluorine adsorption capability of the basic zinc sulfate group fluorine adsorbent/desorbent.

On the other hand, Table 18 shows Zn/F values for the basic zinc sulfate group fluorine adsorbent/desorbent. It is found that although the parameters are different from those for the Fe/F value, adjusting the Zn/F value to 300 enables the basic zinc sulfate group fluorine adsorbent/desorbent alone to achieve a fluorine concentration of 20 mg/L or less.

Tables 19 and 20 show qualitative evaluation results for fluorine adsorption capabilities and desorption capabilities on five types of fluorine adsorbent/desorbent. It was made in order to check which pH region in each of the acid and alkali regions is suitable for the fluorine adsorbent/desorbent.

TABLE 19

Optimum pH range for adsorption

| Fluorine adsorbent/desorbent | | Adsorption pH | | | | | | | | | |
|---|---|---|---|---|---|---|---|---|---|---|---|
| Type | Formula | 0 | 1 | 2 | 3 | 4 | 5 | 6 | 7 | 8 | 9 | 10 |
| Basic iron sulfate-based | $Fe(SO_4)x(OH)y$ | C | C | C | B | A | A | B | C | C | C |
| | $FeO_a(OH)_b(SO_4)_c(H_2O)_d$ | C | C | C | B | A | A | B | C | C | C |
| Oxy iron hydroxide-based | $\alpha\text{-FeOOH}$ | C | B | B | A | A | B | B | C | C | C |
| | $\beta\text{-FeOOH}$ | C | A | A | A | A | B | B | C | C | C |
| Iron oxide-based | $Fe_2O_3$ | C | B | A | A | A | B | B | C | C | C |
| Ferric hydroxide-based | $Fe(OH)_3$ | C | C | C | A | A | B | B | C | C | C |
| Basic zinc sulfate-based | $Zn(SO_4)_x(OH)_y$ | C | C | C | C | A | A | B | C | C | C |

TABLE 20

Optimum pH range for desorption

| Fluorine adsorbent/desorbent | | Desorption pH | | | | | | | | | |
|---|---|---|---|---|---|---|---|---|---|---|---|
| Type | Formula | 4 | 5 | 6 | 7 | 8 | 9 | 10 | 11 | 12 | 13 | 13.5 |
| Basic iron sulfate-based | $Fe(SO_4)x(OH)y$ | C | C | C | B | B | A | A | A | B | B |
| | $FeO_a(OH)_b(SO_4)_c(H_2O)_d$ | C | C | C | B | B | A | A | A | B | B |
| Oxy iron hydroxide-based | $\alpha\text{-FeOOH}$ | C | C | C | B | B | A | A | A | B | B |
| | $\beta\text{-FeOOH}$ | C | C | C | B | B | A | A | A | B | B |
| Iron oxide-based | $Fe_2O_3$ | C | C | C | B | B | A | A | A | B | B |
| Ferric hydroxide-based | $Fe(OH)_3$ | C | C | C | B | B | A | A | A | B | B |
| Basic zinc sulfate-based | $Zn(SO_4)_x(OH)_y$ | C | C | C | B | B | A | A | A | B | B |

The data in Tables 19 and 20 should be considered to be references for qualitative comparison of the fluorine adsorption/desorptions and for determination of a use condition for the pH of the fluorine adsorption/desorption. This is because the fluorine adsorption capability can be easily improved by increasing, for example, the Fe/F value or Zn/F value as described above.

The conditions for qualitative evaluation of the fluorine adsorption capability in Table 19 are a liquid temperature of 60° C., a leached solution fluorine concentration of 200 mg/L, a treatment time of 2 hours, an Fe/F value of 300, and a Zn/F value of 300 (in the case fluorine adsorbent/desorbent is composed of basic zinc sulfate).

A (which is directed to "Excellent"), B (which is directed "Good"), P (which is directed to "Bad (not available)") in Table 19 correspond to an after-adsorption solution fluorine concentration of 20 mg/L or less, more than 20 mg/L and less than 50 mg/L, and being equal to 50 mg/L or more, respectively.

Table 19 indicates that although depending on the type of the adsorbent, a pH of 2 to 5 is suitable for the adsorption capability of the fluorine adsorbent/desorbent according to the present invention.

The conditions for qualitative evaluation of the fluorine desorption capability in Table 20 are a liquid temperature of 60° C., a slurry concentration as an Fe concentration of 40 g/L and as a Zn concentration of 50 g/L (in the case fluorine adsorbent/desorbent is composed of basic zinc sulfate), and a treatment time of 2 hours.

A, B, C in Table 20 correspond to desorption ratio after-fluorine adsorption of 80% or more and 100% or less, 65% or more and 80% or less, and less than 65%, respectively.

Table 20 indicates that although depending on the type of the fluorine adsorbent, a pH of 9 to 12 is suitable for the desorption capability of the fluorine adsorbent/desorbent according to the present invention.

Tables 21 to 27 show evaluations of the adsorption capability (whether or not the fluorine concentration is 20 mg/L or less) and the desorption capability (whether or not the desorption ratio exceeds at least 65%) for a mixture of any of the various fluorine adsorbent/desorbents (80 wt %) and any of the various additives (20 wt %) and for each fluorine adsorbent/desorbent (100 wt %) as well as whether the adsorption capability and desorption capability can withstand repeated use for a mixture of any of the various fluorine adsorbent/desorbents (80 wt %) and any of the various additives (20 wt %) and for each fluorine adsorbent/desorbent (100 wt %).

Table 21 shows data on 80 wt % of basic iron sulfate group fluorine adsorbent/desorbent ($Fe(SO_4)_x(OH)_y$) to which 20 wt % of aluminum, titanium, zirconium or magnesium was added as an additive and on 100 wt % of basic iron sulfate group compound ($Fe(SO_4)_x(OH)_y$). The data are arranged in this order from the top of the table.

TABLE 21

| Fluorine adsorbent/desorbent | | Adsorbing and desorption capability | | | | | | |
|---|---|---|---|---|---|---|---|---|
| | | Adsorption capability Fe/F value = 203 pH 4.5 | | | | Desorption capability Slurry concentration as Fe: 40 g/L pH 12 | | |
| Fluorine adsorbent/desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Basic iron sulfate group fluorine adsorbent/desorbent with Al addition | $Fe(SO_4)_x$—$(OH)_y$ | 1 | 278 | 8.3 | 4.8 | 1 | 78 | 3.7 |
| | | 2 | 278 | 10.5 | 4.7 | 2 | 86 | 4.1 |
| | | 3 | 278 | 11.3 | 4.7 | 3 | 102 | 4.8 |
| | | 4 | 278 | 10.1 | 4.7 | 4 | 98 | 4.7 |
| | | 5 | 278 | 10.6 | 4.7 | 5 | 98 | 4.6 |
| Basic iron sulfate group fluorine adsorbent/desorbent with Ti addition | $Fe(SO_4)_x$—$(OH)_y$ | 1 | 278 | 11.8 | 4.7 | 1 | 65 | 3.1 |
| | | 2 | 278 | 17.6 | 4.6 | 2 | 71 | 3.3 |
| | | 3 | 278 | 15.4 | 4.7 | 3 | 88 | 4.1 |
| | | 4 | 278 | 13.9 | 4.7 | 4 | 98 | 4.6 |
| | | 5 | 278 | 14.1 | 4.7 | 5 | 96 | 4.5 |
| Basic iron sulfate group fluorine adsorbent/desorbent with Zr addition | $Fe(SO_4)_x$—$(OH)_y$ | 1 | 278 | 10.1 | 4.7 | 1 | 69 | 3.3 |
| | | 2 | 278 | 12.7 | 4.7 | 2 | 77 | 3.6 |
| | | 3 | 278 | 13.2 | 4.7 | 3 | 101 | 4.7 |
| | | 4 | 278 | 14.4 | 4.7 | 4 | 99 | 4.6 |
| | | 5 | 278 | 12.3 | 4.7 | 5 | 98 | 4.6 |
| Basic iron sulfate group fluorine adsorbent/desorbent with Mg addition | $Fe(SO_4)_x$—$(OH)_y$ | 1 | 278 | 13.2 | 4.7 | 1 | 59 | 2.8 |
| | | 2 | 278 | 19.7 | 4.6 | 2 | 85 | 3.9 |
| | | 3 | 278 | 18.7 | 4.6 | 3 | 90 | 4.1 |
| | | 4 | 278 | 17.3 | 4.6 | 4 | 97 | 4.5 |
| | | 5 | 278 | 18.9 | 4.6 | 5 | 93 | 4.3 |

TABLE 21-continued

| Fluorine adsorbent/desorbent | | Adsorbing and desorption capability | | | | | | |
|---|---|---|---|---|---|---|---|---|
| | | Adsorption capability Fe/F value = 203 pH 4.5 | | | | Desorption capability Slurry concentration as Fe: 40 g/L | | |
| | | F concentration | | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Basic iron sulfate group fluorine adsorbent/ desorbent without additives | $Fe(SO_4)_x$—$(OH)_y$ | 1 | 278 | 21.2 | 4.6 | 1 | 72 | 3.3 |
| | | 2 | 278 | 27.9 | 4.4 | 2 | 80 | 3.5 |
| | | 3 | 278 | 30.9 | 4.4 | 3 | 93 | 4.1 |
| | | 4 | 278 | 28.2 | 4.4 | 4 | 96 | 4.2 |
| | | 5 | 278 | 29.4 | 4.4 | 5 | 97 | 4.3 |

In Table 21, for the adsorption capability, common conditions were used: the fluorine concentration of the leached solution was adjusted to 278 mg/L and the fluorine adsorbent/desorbent in the solution was adjusted to have a Fe/F value of 203 and a pH of 4.5. Moreover, in Table 21, for the desorption capability, after fluorine adsorption, the slurry concentration of the solution as Fe in the fluorine adsorbent/desorbent was 40 g/L and its pH was 12.

As shown in Table 21, the 80 wt % of basic iron sulfate group fluorine adsorbent/desorbent $(Fe(SO_4)_x(OH)_y)$ to which the 20 wt % of aluminum, titanium, zirconium or magnesium was added had high adsorption capabilities and desorption capabilities and could withstand repeated use. The 100 wt % of basic iron sulfate group compound $(Fe(SO_4)_x(OH)_y)$ was slightly inferior to the basic iron sulfate group fluorine adsorbent/desorbent with an additive and failed to achieve the target value of 20 mg/L or less. Also in this case, an increase in Fe/F value makes it possible to achieve the target fluorine concentration of 20 mg/L or less as previously described.

TABLE 22

| Fluorine adsorbent/desorbent | | Adsorbing and desorption capability | | | | | | |
|---|---|---|---|---|---|---|---|---|
| | | Adsorption capability Fe/F value = 250 pH 4.5 | | | | Desorption capability Slurry concentration as Fe: 50 g/L | | |
| | | F concentration | | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Basic iron sulfate group fluorine adsorbent/ desorbent with Al addition | $FeO_a(OH)_b$—$(SO_4)_c$—$(H_2O)_d$ | 1 | 278 | 9.6 | 4.8 | 1 | 82 | 3.9 |
| | | 2 | 278 | 11.7 | 4.7 | 2 | 96 | 4.5 |
| | | 3 | 278 | 12.9 | 4.7 | 3 | 92 | 4.3 |
| | | 4 | 278 | 11.9 | 4.7 | 4 | 93 | 4.4 |
| | | 5 | 278 | 12.1 | 4.7 | 5 | 94 | 4.4 |
| Basic iron sulfate group fluorine adsorbent/ desorbent with Ti addition | $FeO_a(OH)_b$—$(SO_4)_c$—$(H_2O)_d$ | 1 | 278 | 17.4 | 4.6 | 1 | 62 | 2.9 |
| | | 2 | 278 | 19.9 | 4.6 | 2 | 82 | 3.8 |
| | | 3 | 278 | 17.9 | 4.6 | 3 | 93 | 4.3 |
| | | 4 | 278 | 19.1 | 4.6 | 4 | 95 | 4.4 |
| | | 5 | 278 | 19.8 | 4.6 | 5 | 92 | 4.2 |
| Basic iron sulfate group fluorine adsorbent/ desorbent with Zr addition | $FeO_a(OH)_b$—$(SO_4)_c$—$(H_2O)_d$ | 1 | 278 | 15.6 | 4.6 | 1 | 72 | 3.4 |
| | | 2 | 278 | 18.1 | 4.6 | 2 | 79 | 3.6 |
| | | 3 | 278 | 18.3 | 4.6 | 3 | 96 | 4.4 |
| | | 4 | 278 | 19.5 | 4.6 | 4 | 87 | 4.0 |
| | | 5 | 278 | 17.7 | 4.6 | 5 | 88 | 4.1 |

TABLE 22-continued

| Fluorine adsorbent/desorbent | | Adsorbing and desorption capability | | | | | | |
|---|---|---|---|---|---|---|---|---|
| | | Adsorption capability Fe/F value = 250 pH 4.5 | | | | Desorption capability Slurry concentration as Fe: 50 g/L | | |
| | | F concentration | | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Basic iron sulfate group fluorine adsorbent/ desorbent with Mg addition | $FeO_a(OH)_b$—$(SO_4)_c$—$(H_2O)_d$ | 1 | 278 | 12.7 | 4.7 | 1 | 79 | 3.7 |
| | | 2 | 278 | 19.0 | 4.6 | 2 | 86 | 4.0 |
| | | 3 | 278 | 18.6 | 4.6 | 3 | 92 | 4.2 |
| | | 4 | 278 | 16.4 | 4.6 | 4 | 93 | 4.3 |
| | | 5 | 278 | 17.8 | 4.6 | 5 | 98 | 4.5 |
| Basic iron sulfate group fluorine adsorbent/ desorbent without additives | $FeO_a(OH)_b$—$(SO_4)_c$—$(H_2O)_d$ | 1 | 278 | 24.4 | 4.6 | 1 | 83 | 3.8 |
| | | 2 | 278 | 23.3 | 4.4 | 2 | 95 | 4.2 |
| | | 3 | 278 | 28.9 | 4.4 | 3 | 87 | 3.8 |
| | | 4 | 278 | 29.7 | 4.4 | 4 | 93 | 4.1 |
| | | 5 | 278 | 26.4 | 4.4 | 5 | 86 | 3.8 |

Table 22 shows data on 80 wt % of basic iron sulfate group iron compound $(FeO_a(OH)_b(SO_4)_c(H_2O)_d)$ to which 20 wt % of aluminum, titanium, zirconium or magnesium was added as an additive and on 100 wt % of basic iron sulfate group iron compound $(FeO_a(OH)_b(SO_4)_c(H_2O)_d)$. The data are arranged in this order from the top of the table.

In Table 22, for the adsorption capability, common conditions were used: the fluorine concentration of the leached solution was adjusted to 278 mg/L and the fluorine adsorbent/desorbent in the solution was adjusted to have a Fe/F value of 200 and a pH of 4.5. Moreover, in Table 22, for the desorption capability after fluorine adsorption, the slurry concentration of the solution as Fe in the fluorine adsorbent/desorbent was 40 g/L and its pH was 12.

As shown in Table 22, the 80 wt % of basic iron sulfate group iron compound $(FeO_a(OH)_b(SO_4)_c(H_2O)_d)$ to which the 20 wt % of aluminum, titanium, zirconium or magnesium was added as an additive had high adsorption capabilities and desorption capabilities and could withstand repeated use. The 100 wt % of basic iron sulfate group iron compound $(FeO_a(OH)_b(SO_4)_c(H_2O)_d)$ was slightly inferior to the basic iron sulfate group fluorine adsorbent/desorbent with an additive and failed to achieve the target value fluorine concentration of 20 mg/L or less. Also in this case, an increase in Fe/F value makes it possible to achieve the target fluorine concentration of 20 mg/L or less as previously described.

TABLE 23

| Fluorine adsorbent/desorbent | | Adsorbing and desorption capability | | | | | | |
|---|---|---|---|---|---|---|---|---|
| | | Adsorption capability Fe/F value = 250 pH 4.5 | | | | Desorption capability Slurry concentration as Fe: 50 g/L | | |
| | | F concentration | | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Oxy iron hydroxide group fluorine adsorbent/ desorbent with Al addition | α-FeOOH | 1 | 278 | 9.2 | 6.4 | 1 | 93 | 6.0 |
| | | 2 | 278 | 10.3 | 6.4 | 2 | 99 | 6.3 |
| | | 3 | 278 | 9.6 | 6.4 | 3 | 98 | 6.3 |
| | | 4 | 278 | 11.5 | 6.4 | 4 | 96 | 6.1 |
| | | 5 | 278 | 10.3 | 6.4 | 5 | 89 | 5.7 |
| Oxy iron hydroxide group | α-FeOOH | 1 | 278 | 13.6 | 6.3 | 1 | 93 | 5.9 |
| | | 2 | 278 | 16.3 | 6.3 | 2 | 91 | 5.7 |
| | | 3 | 278 | 15.2 | 6.3 | 3 | 98 | 6.2 |

TABLE 23-continued

| Fluorine adsorbent/desorbent | | Adsorbing and desorption capability | | | | | | |
|---|---|---|---|---|---|---|---|---|
| | | Adsorption capability Fe/F value = 250 pH 4.5 | | | | Desorption capability Slurry concentration as Fe: 50 g/L | | |
| | | | F concentration | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| fluorine adsorbent/ desorbent with Ti addition | | 4 | 278 | 17.9 | 6.2 | 4 | 96 | 6.0 |
| | | 5 | 278 | 20.6 | 6.2 | 5 | 92 | 5.7 |
| Oxy iron hydroxide group fluorine adsorbent/ desorbent with Zr addition | α-FeOOH | 1 | 278 | 10.2 | 6.4 | 1 | 93 | 6.0 |
| | | 2 | 278 | 10.2 | 6.4 | 2 | 93 | 6.0 |
| | | 3 | 278 | 11.3 | 6.4 | 3 | 95 | 6.1 |
| | | 4 | 278 | 13.3 | 6.3 | 4 | 94 | 6.0 |
| | | 5 | 278 | 12.9 | 6.4 | 5 | 96 | 6.1 |
| Oxy iron hydroxide group fluorine adsorbent/ desorbent with Mg addition | α-FeOOH | 1 | 278 | 16.9 | 6.3 | 1 | 95 | 5.9 |
| | | 2 | 278 | 18.6 | 6.2 | 2 | 96 | 6.0 |
| | | 3 | 278 | 17.9 | 6.2 | 3 | 97 | 6.1 |
| | | 4 | 278 | 18.6 | 6.2 | 4 | 96 | 6.0 |
| | | 5 | 278 | 18.3 | 6.2 | 5 | 96 | 6.0 |
| Oxy iron hydroxide group fluorine adsorbent/ desorbent without additives | α-FeOOH | 1 | 278 | 19.0 | 6.2 | 1 | 92 | 5.7 |
| | | 2 | 278 | 19.7 | 6.2 | 2 | 88 | 5.5 |
| | | 3 | 278 | 21.3 | 6.2 | 3 | 102 | 6.3 |
| | | 4 | 278 | 22.3 | 6.1 | 4 | 96 | 5.9 |
| | | 5 | 278 | 23.2 | 6.1 | 5 | 95 | 5.8 |

Table 23 shows data on 80 wt % of oxy iron hydroxide group fluorine adsorbent/desorbent (α-FeOOH) to which 20 wt % of aluminum, titanium, zirconium or magnesium was added as an additive and on 100 wt % of oxy iron hydroxide group fluorine adsorbent/desorbent (α-FeOOH); the data are arranged in this order from the top of the table.

In Table 23, for the adsorption capability, common conditions were used: the fluorine concentration of the leached solution was adjusted to 278 mg/L and the fluorine adsorbent/desorbent in the solution was adjusted to have a Fe/F value of 250 and a pH of 4.5. Moreover, in Table 23, for the desorption capability after fluorine adsorption, the slurry concentration of the solution as Fe in the fluorine adsorbent/desorbent was 50 g/L and its pH was 12.

As shown in Table 23, the 80 wt % of oxy iron hydroxide group fluorine adsorbent/desorbent (α-FeOOH) to which the 20 wt % of aluminum, titanium, zirconium or magnesium was added as an additive had high adsorption capabilities and desorption capabilities and could withstand repeated use. The 100 wt % of oxy iron hydroxide group fluorine adsorbent/desorbent (α-FeOOH) was slightly inferior to the oxy iron hydroxide group fluorine adsorbent/desorbent with an additive and failed to achieve the target fluorine concentration of 20 mg/L or less. Also in this case, an increase in Fe/F value makes it possible to achieve the target fluorine concentration of 20 mg/L or less as previously described.

TABLE 24

| Fluorine adsorbent/desorbent | | Adsorbing and desorption capability | | | | | | |
|---|---|---|---|---|---|---|---|---|
| | | Adsorption capability Fe/F value = 150 pH 2.0 | | | | Desorption capability Slurry concentration as Fe: 40 g/L | | |
| | | | F concentration | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Oxy iron hydroxide group | β-FeOOH | 1 | 280 | 7.8 | 6.5 | 1 | 36 | 2.4 |
| | | 2 | 280 | 8.8 | 6.5 | 2 | 63 | 4.1 |
| | | 3 | 280 | 9.2 | 6.4 | 3 | 72 | 4.6 |

TABLE 24-continued

| | | Adsorbing and desorption capability | | | | | |
|---|---|---|---|---|---|---|---|
| Fluorine adsorbent/desorbent | | Adsorption capability Fe/F value = 150 pH 2.0 | | | Desorption capability Slurry concentration as Fe: 40 g/L | | |
| | | F concentration | | | pH 12 | | |
| Fluorine adsorbent/ desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| fluorine adsorbent/ desorbent with Al addition | | 4 | 280 | 10.5 | 6.4 | 4 | 103 | 6.6 |
| | | 5 | 280 | 8.9 | 6.5 | 5 | 98 | 6.3 |
| Oxy iron hydroxide group fluorine adsorbent/ desorbent with Ti addition | β-FeOOH | 1 | 280 | 12.0 | 6.4 | 1 | 43 | 2.7 |
| | | 2 | 280 | 13.3 | 6.4 | 2 | 78 | 5.0 |
| | | 3 | 280 | 14.0 | 6.3 | 3 | 90 | 5.7 |
| | | 4 | 280 | 13.6 | 6.3 | 4 | 95 | 6.0 |
| | | 5 | 280 | 14.7 | 6.3 | 5 | 98 | 6.2 |
| Oxy iron hydroxide group fluorine adsorbent/ desorbent with Zr addition | β-FeOOH | 1 | 280 | 2.0 | 6.6 | 1 | 52 | 3.4 |
| | | 2 | 280 | 4.2 | 6.6 | 2 | 71 | 4.7 |
| | | 3 | 280 | 5.1 | 6.5 | 3 | 98 | 6.4 |
| | | 4 | 280 | 5.8 | 6.5 | 4 | 87 | 5.7 |
| | | 5 | 280 | 5.8 | 6.5 | 5 | 96 | 6.3 |
| Oxy iron hydroxide group fluorine adsorbent/ desorbent with Mg addition | β-FeOOH | 1 | 280 | 9.9 | 6.4 | 1 | 43 | 2.8 |
| | | 2 | 280 | 11.1 | 6.4 | 2 | 71 | 4.5 |
| | | 3 | 280 | 11.5 | 6.4 | 3 | 98 | 6.3 |
| | | 4 | 280 | 11.1 | 6.4 | 4 | 90 | 5.8 |
| | | 5 | 280 | 12.4 | 6.4 | 5 | 102 | 6.5 |
| Oxy iron hydroxide group fluorine adsorbent/ desorbent with Cu addition | β-FeOOH | 1 | 280 | 4.2 | 6.6 | 1 | 41 | 2.7 |
| | | 2 | 280 | 5.6 | 6.5 | 2 | 76 | 5.0 |
| | | 3 | 280 | 6.6 | 6.5 | 3 | 90 | 5.9 |
| | | 4 | 280 | 6.4 | 6.5 | 4 | 110 | 7.2 |
| | | 5 | 280 | 6.2 | 6.5 | 5 | 99 | 6.5 |
| Oxy iron hydroxide group fluorine adsorbent/ desorbent without additives | β-FeOOH | 1 | 280 | 18.0 | 6.2 | 1 | 39 | 2.4 |
| | | 2 | 280 | 21.2 | 6.2 | 2 | 65 | 4.0 |
| | | 3 | 280 | 21.8 | 6.1 | 3 | 89 | 5.5 |
| | | 4 | 280 | 21.7 | 6.2 | 4 | 95 | 5.8 |
| | | 5 | 280 | 21.2 | 6.2 | 5 | 98 | 6.0 |

Table 24 shows data on 80 wt % of oxy iron hydroxide group fluorine adsorbent/desorbent (β-FeOOH) to which 20 wt % of aluminum, titanium, zirconium, magnesium or copper was added as an additive and on 100 wt % of oxy iron hydroxide group fluorine adsorbent/desorbent (β-FeOOH); the data are arranged in this order from the top of the table.

In Table 24, for the adsorption capability, common conditions were used: the fluorine concentration of the leached solution was adjusted to 280 mg/L and the fluorine adsorbent/desorbent in the solution was adjusted to have a Fe/F value of 150 and a pH of 2.0. Moreover, in Table 24, for the desorption capability after fluorine adsorption, the slurry concentration of the solution as Fe in the fluorine adsorbent/desorbent was 40 g/L and its pH was 12.

As shown in Table 24, the 80 wt % of oxy iron hydroxide group fluorine adsorbent/desorbent (β-FeOOH) to which the 20 wt % of aluminum, titanium, zirconium or magnesium was added as an additive had high adsorption capabilities and desorption capabilities and could withstand repeated use. The 100 wt % of oxy iron hydroxide group fluorine adsorbent/desorbent (β-FeOOH) was slightly inferior to the oxy iron hydroxide iron group fluorine adsorbent/desorbent with an additive and failed to achieve the target fluorine concentration of 20 mg/L or less. Also in this case, an increase in Fe/F value makes it possible to achieve the target fluorine concentration of 20 mg/L or less as previously described.

TABLE 25

| Fluorine adsorbent/desorbent | | | Adsorbing and desorption capability | | | | | |
|---|---|---|---|---|---|---|---|---|
| | | | Adsorption capability Fe/F value = 275 pH 4.5 | | | Desorption capability Slurry concentration as Fe: 50 g/L pH 12 | | |
| Fluorine adsorbent/desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Iron oxide group fluorine adsorbent/desorbent with Al addition | α-Fe$_2$O$_3$ | 1 | 278 | 9.3 | 6.4 | 1 | 90 | 5.8 |
| | | 2 | 278 | 11.8 | 6.4 | 2 | 98 | 6.3 |
| | | 3 | 278 | 12.3 | 6.4 | 3 | 93 | 5.9 |
| | | 4 | 278 | 11.1 | 6.4 | 4 | 97 | 6.2 |
| | | 5 | 278 | 11.6 | 6.4 | 5 | 96 | 6.1 |
| Iron oxide group fluorine adsorbent/desorbent with Ti addition | α-Fe$_2$O$_3$ | 1 | 278 | 13.2 | 6.4 | 1 | 86 | 5.5 |
| | | 2 | 278 | 15.8 | 6.3 | 2 | 96 | 6.0 |
| | | 3 | 278 | 16.3 | 6.3 | 3 | 92 | 5.8 |
| | | 4 | 278 | 17.5 | 6.2 | 4 | 87 | 5.4 |
| | | 5 | 278 | 16.3 | 6.3 | 5 | 98 | 6.2 |
| Iron oxide group fluorine adsorbent/desorbent with Zr addition | α-Fe$_2$O$_3$ | 1 | 278 | 12.5 | 6.4 | 1 | 96 | 6.1 |
| | | 2 | 278 | 14.7 | 6.3 | 2 | 92 | 5.8 |
| | | 3 | 278 | 15.5 | 6.3 | 3 | 95 | 6.0 |
| | | 4 | 278 | 13.1 | 6.4 | 4 | 98 | 6.2 |
| | | 5 | 278 | 14.8 | 6.3 | 5 | 96 | 6.1 |
| Iron oxide group fluorine adsorbent/desorbent with Mg addition | α-Fe$_2$O$_3$ | 1 | 278 | 15.2 | 6.3 | 1 | 90 | 5.7 |
| | | 2 | 278 | 20.0 | 6.2 | 2 | 94 | 5.8 |
| | | 3 | 278 | 18.8 | 6.2 | 3 | 85 | 5.3 |
| | | 4 | 278 | 17.3 | 6.3 | 4 | 91 | 5.7 |
| | | 5 | 278 | 17.5 | 6.2 | 5 | 93 | 5.8 |
| Iron oxide group fluorine adsorbent/desorbent without additives | α-Fe$_2$O$_3$ | 1 | 278 | 21.1 | 6.2 | 1 | 88 | 5.4 |
| | | 2 | 278 | 23.7 | 6.1 | 2 | 95 | 5.8 |
| | | 3 | 278 | 24.1 | 6.1 | 3 | 93 | 5.7 |
| | | 4 | 278 | 22.9 | 6.1 | 4 | 97 | 5.9 |
| | | 5 | 278 | 25.4 | 6.1 | 5 | 96 | 5.8 |

Table 25 shows data on 80 wt % of iron oxide group fluorine adsorbent/desorbent (α-Fe$_2$O$_3$) to which 20 wt % of aluminum, titanium, zirconium or magnesium was added as an additive and on 100 wt % of iron oxide group fluorine adsorbent/desorbent (α-Fe$_2$O$_3$). The data are arranged in this order from the top of the table.

In Table 25, for the adsorption capability, common conditions were used: the fluorine concentration of the leached solution was adjusted to 278 mg/L and the fluorine adsorbent/desorbent in the solution was adjusted to have a Fe/F value of 275 and a pH of 4.5. Moreover, in Table 26, for the desorption capability after fluorine adsorption, the slurry concentration of the solution as Fe in the fluorine adsorbent/desorbent was 50 g/L and its pH was 12.

As shown in Table 25, the 80 wt % of iron oxide group fluorine adsorbent/desorbent (α-Fe$_2$O$_3$) to which the 20 wt % of aluminum, titanium, zirconium or magnesium was added as an additive had high adsorption capabilities and desorption capabilities and could withstand repeated use. The 100 wt % of iron oxide group fluorine adsorbent/desorbent (α-Fe$_2$O$_3$)

was slightly inferior to the iron oxide group fluorine adsorbent/desorbent with an additive and failed to achieve the target fluorine concentration of 20 mg/L or less. Also in this case, an increase in Fe/F value makes it possible to achieve the target fluorine concentration of 20 mg/L or less as previously described.

300 and a pH of 4.5. Moreover, in Table 26, for the desorption capability after fluorine adsorption, the slurry concentration of the solution as Fe in the fluorine adsorbent/desorbent was 50 g/L and its pH was 12.

As shown in Table 26, the 80 wt % of ferric hydroxide group fluorine adsorbent/desorbent ($Fe(OH)_3$) to which the

TABLE 26

| | | Adsorbing and desorption capability | | | | | |
|---|---|---|---|---|---|---|---|
| | | Adsorption capability Fe/F value = 300 pH 4.5 | | | | Desorption capability Slurry concentration as Fe: 50 g/L pH 12 | |
| Fluorine adsorbent/desorbent | | | F concentration | | | | |
| Fluorine adsorbent/desorbent type | Formula | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Ferric hydroxide group fluorine adsorbent/ desorbent with Al addition | $Fe(OH)_3$ | 1 | 278 | 10.6 | 4.8 | 1 | 80 | 3.8 |
| | | 2 | 278 | 13.2 | 4.8 | 2 | 86 | 4.1 |
| | | 3 | 278 | 15.2 | 4.7 | 3 | 71 | 3.4 |
| | | 4 | 278 | 13.8 | 4.8 | 4 | 98 | 4.7 |
| | | 5 | 278 | 16.4 | 4.7 | 5 | 80 | 3.8 |
| Ferric hydroxide group fluorine adsorbent/ desorbent with Ti addition | $Fe(OH)_3$ | 1 | 278 | 15.8 | 4.7 | 1 | 88 | 4.1 |
| | | 2 | 278 | 16.3 | 4.7 | 2 | 98 | 4.6 |
| | | 3 | 278 | 18.9 | 4.7 | 3 | 101 | 4.7 |
| | | 4 | 278 | 12.7 | 4.8 | 4 | 90 | 4.3 |
| | | 5 | 278 | 18.6 | 4.7 | 5 | 93 | 4.3 |
| Ferric hydroxide group fluorine adsorbent/ desorbent with Zr addition | $Fe(OH)_3$ | 1 | 278 | 12.3 | 4.8 | 1 | 98 | 4.7 |
| | | 2 | 278 | 15.4 | 4.7 | 2 | 96 | 4.5 |
| | | 3 | 278 | 16.5 | 4.7 | 3 | 87 | 4.1 |
| | | 4 | 278 | 15.8 | 4.7 | 4 | 90 | 4.2 |
| | | 5 | 278 | 17.2 | 4.7 | 5 | 93 | 4.4 |
| Ferric hydroxide group fluorine adsorbent/ desorbent with Mg addition | $Fe(OH)_3$ | 1 | 278 | 19.3 | 4.7 | 1 | 71 | 3.3 |
| | | 2 | 278 | 18.5 | 4.7 | 2 | 96 | 4.5 |
| | | 3 | 278 | 19.8 | 4.6 | 3 | 98 | 4.6 |
| | | 4 | 278 | 20.0 | 4.6 | 4 | 88 | 4.1 |
| | | 5 | 278 | 19.9 | 4.6 | 5 | 97 | 4.5 |
| Ferric hydroxide group fluorine adsorbent/ desorbent without additives | $Fe(OH)_3$ | 1 | 278 | 22.0 | 4.6 | 1 | 72 | 3.3 |
| | | 2 | 278 | 25.6 | 4.5 | 2 | 96 | 4.4 |
| | | 3 | 278 | 26.3 | 4.5 | 3 | 98 | 4.4 |
| | | 4 | 278 | 27.2 | 4.5 | 4 | 87 | 3.9 |
| | | 5 | 278 | 25.2 | 4.5 | 5 | 95 | 4.3 |

Table 26 shows data on 80 wt % of ferric hydroxide group fluorine adsorbent/desorbent ($Fe(OH)_3$) to which 20 wt % of aluminum, titanium, zirconium or magnesium was added as an additive and on 100 wt % of ferric hydroxide group fluorine adsorbent/desorbent ($Fe(OH)_3$). The data are arranged in this order from the top of the table.

In Table 26, for the adsorption capability, common conditions were used: the fluorine concentration of the leached solution was adjusted to 278 mg/L and the fluorine adsorbent/desorbent in the solution was adjusted to have a Fe/F value of 20 wt % of aluminum, titanium, zirconium or magnesium was added as an additive had high adsorption capabilities and desorption capabilities and could withstand repeated use. The 100 wt % of ferric hydroxide group fluorine adsorbent/desorbent ($Fe(OH)_3$) was slightly inferior to the ferric hydroxide group fluorine adsorbent/desorbent with an additive and failed to achieve the target fluorine concentration of 20 mg/L or less. Also in this case, an increase in Fe/F value makes it possible to achieve the target fluorine concentration of 20 mg/L or less as previously described.

TABLE 27

| Fluorine adsorbent/desorbent type | Formula | Adsorbing and desorption capability | | | | | | |
|---|---|---|---|---|---|---|---|---|
| | | Adsorption capability Fe/F value = 250 pH 4.5 | | | | Desorption capability Slurry concentration as Fe: 50 g/L pH 12 | | |
| | | Number of adsorptions | F concentration in Leached Solution (mg/L) | F concentration after adsorption (mg/L) | Amount of F adsorbed (F/Fe (mg/g) value) | Number of desorptions | Desorption ratio % | Amount of F desorbed (F/Fe (mg/g) value) |
| Basic zinc sulfate group fluorine adsorbent/desorbent with Al addition | $Zn(SO_4)_x \bullet (OH)_y$ | 1 | 291 | 12.1 | 3.8 | 1 | 90 | 3.5 |
| | | 2 | 291 | 13.3 | 3.8 | 2 | 101 | 3.9 |
| | | 3 | 291 | 16.3 | 3.8 | 3 | 93 | 3.5 |
| | | 4 | 291 | 15.4 | 3.8 | 4 | 102 | 3.9 |
| | | 5 | 291 | 14.1 | 3.8 | 5 | 96 | 3.7 |
| Basic zinc sulfate group fluorine adsorbent/desorbent with Ti addition | $Zn(SO_4)_x \square (OH)_y$ | 1 | 291 | 15.2 | 3.8 | 1 | 86 | 3.3 |
| | | 2 | 291 | 19.6 | 3.7 | 2 | 89 | 3.3 |
| | | 3 | 291 | 18.2 | 3.7 | 3 | 98 | 3.7 |
| | | 4 | 291 | 18.5 | 3.7 | 4 | 87 | 3.3 |
| | | 5 | 291 | 18.6 | 3.7 | 5 | 98 | 3.7 |
| Basic zinc sulfate group fluorine adsorbent/desorbent with Zr addition | $Zn(SO_4)_x \bullet (OH)_y$ | 1 | 291 | 14.0 | 3.8 | 1 | 96 | 3.7 |
| | | 2 | 291 | 15.7 | 3.8 | 2 | 92 | 3.5 |
| | | 3 | 291 | 17.0 | 3.8 | 3 | 95 | 3.6 |
| | | 4 | 291 | 16.8 | 3.8 | 4 | 104 | 3.9 |
| | | 5 | 291 | 16.8 | 3.8 | 5 | 100 | 3.8 |
| Basic zinc sulfate group fluorine adsorbent/desorbent with Mg addition | $Zn(SO_4)_x \bullet (OH)_y$ | 1 | 291 | 16.3 | 3.8 | 1 | 90 | 3.4 |
| | | 2 | 291 | 18.7 | 3.7 | 2 | 98 | 3.7 |
| | | 3 | 291 | 20.0 | 3.7 | 3 | 97 | 3.6 |
| | | 4 | 291 | 18.8 | 3.7 | 4 | 99 | 3.7 |
| | | 5 | 291 | 20.0 | 3.7 | 5 | 89 | 3.3 |
| Basic zinc sulfate group fluorine adsorbent/desorbent without additives | $Zn(SO_4)_x \bullet (OH)_y$ | 1 | 291 | 24.2 | 3.7 | 1 | 85 | 3.1 |
| | | 2 | 291 | 30.9 | 3.6 | 2 | 95 | 3.4 |
| | | 3 | 291 | 32.7 | 3.6 | 3 | 93 | 3.3 |
| | | 4 | 291 | 32.5 | 3.6 | 4 | 99 | 3.5 |
| | | 5 | 291 | 31.8 | 3.6 | 5 | 89 | 3.2 |

Table 27 shows data on 80 wt % of basic zinc sulfate group fluorine adsorbent/desorbent $(Zn(SO_4)_x(OH)_y)$ to which 20 wt % of aluminum, titanium, zirconium or magnesium was added as an additive and on 100 wt % of basic zinc sulfate group fluorine adsorbent/desorbent $(Zn(SO_4)_x(OH)_y)$. The data are arranged in this order from the top of the table.

In Table 27, for the adsorption capability, common conditions were used: the fluorine concentration of the leached solution was adjusted to 291 mg/L and the fluorine adsorbent/desorbent in the solution was adjusted to have a Zn/F value of 300 and a pH of 4.5. Moreover, in Table 27, for the desorption capability after fluorine adsorption, the slurry concentration of the solution as Fe in the fluorine adsorbent/desorbent was 50 g/L and its pH was 12.

As shown in Table 27, the 80 wt % of basic zinc sulfate group fluorine adsorbent/desorbent $(Zn(SO_4)_x(OH)_y)$ to which the 20 wt % of aluminum, titanium, zirconium or magnesium was added as an additive had high adsorption capabilities and desorption capabilities and could withstand repeated use. The 100 wt % of basic zinc sulfate group fluorine adsorbent/desorbent $(Zn(SO_4)_x(OH)_y)$ was slightly inferior to the basic zinc sulfate group fluorine adsorbent/desorbent with an additive and failed to achieve the target fluorine concentration of 20 mg/L or less. Also in this case, an increase in Zn/F value makes it possible to achieve the target fluorine concentration of 20 mg/L or less as previously described.

In the above embodiments and examples of the present invention, the specific contents of the present invention are shown. However, various changes may be made to the embodiments and examples by those who skilled in the art on the basis of the basic concepts and teachings of the present invention. For example, for the various conditions including the parameters described above, the parameter values may vary slightly as expected by those skilled in the art on a pilot or mass production scale.

Industrial Applicability

Removing of fluorine from a zinc solution obtained by dissolving a zinc containing material before zinc electrolysis makes it possible to prevent zinc from being inappropriately stripped off as a result of the corrosion of an aluminum plate serving as a cathode when zinc is electrolytically refined. It makes management of electrolysis of zinc smooth and thus electro-refining of zinc by using the zinc containing material is enabled. Further, it is possible to reuse a fluorine adsorbent/desorbent used in a process for removing fluorine or an alkaline solution used during a process for desorbing fluorine from the fluorine adsorbent/desorbent. Therefore, zinc manufacturing costs can be reduced.

What is claimed is:

1. A method for removing fluorine from a zinc electrolytic solution containing fluorine, comprising:
  a) adsorbing in a slurry having a pH of from 3.0 to less than 7.0 the fluorine to a fluorine adsorbent/desorbent comprising at least one basic iron sulfate group iron compound;
  b) separating the slurry obtained in a) into a solid and a liquid;
  c) putting the solid separated in b) into an alkaline solution to desorb the fluorine from the fluorine adsorbent/desorbent;
  d) separating in a second solid/liquid separating step the solution obtained in c) into a solid and a liquid; and
  e) reusing the solid separated in the step d) or a solution after dissolving the solid in an acid solution having a pH of less than 2.0 in step a) as fluorine adsorbent/desorbent.

2. The method for removing fluorine according to claim 1, wherein when the fluorine adsorbent/desorbent as a whole is assumed to be 100 wt %, the fluorine adsorbent/desorbent comprises:
  80 wt % to 99 wt % of at least one of a basic iron sulfate group iron compound selected from at least one of $Fe(SO_4)_x(OH)_y$ (wherein x and y are any real positive numbers) and $FeO_a(OH)_b(SO_4)_c(H_2O)_d$ (wherein a, b, c, and d are any real positive numbers); and 1 wt % to 20 Wt % of at least one of aluminum, titanium, zirconium and magnesium, or a compound of at least one of aluminum, titanium, zirconium and magnesium.

3. The method for removing fluorine according to claim 1, wherein the at least one basic iron sulfate group iron compound adsorbs the fluorine in an acid solution having a pH of from 3.0 to less than 7.0 and desorbs the fluorine in an alkaline solution having a pH of greater than 7.0 to less than or equal to 13.5.

* * * * *